US006336124B1

(12) United States Patent
Alam et al.

(10) Patent No.: US 6,336,124 B1
(45) Date of Patent: Jan. 1, 2002

(54) CONVERSION DATA REPRESENTING A DOCUMENT TO OTHER FORMATS FOR MANIPULATION AND DISPLAY

(75) Inventors: Hassan Alam; Koichi Ariyoshi; Rachmat Hartono; Timotius Tjahjadi, all of San Jose, CA (US); Scott Tupaj, Cambridge, MA (US); Hanyen Widjaja, San Jose, CA (US)

(73) Assignee: BCL Computers, Inc., Santa Clara, CA (US)

( * ) Notice: Subject to any disclaimer, the term of this patent is extended or adjusted under 35 U.S.C. 154(b) by 0 days.

(21) Appl. No.: 09/346,786

(22) Filed: Jul. 7, 1999

Related U.S. Application Data

(60) Provisional application No. 60/102,688, filed on Oct. 1, 1998.

(51) Int. Cl.$^7$ ............................................. G06F 17/30
(52) U.S. Cl. ............................. 707/523; 709/246
(58) Field of Search ........................... 707/104, 508, 707/509, 201, 513, 522–523; 382/175, 193; 345/349; 709/246; 710/20, 65

(56) References Cited

U.S. PATENT DOCUMENTS

| | | | |
|---|---|---|---|
| 4,723,209 A | * 2/1988 | Hernandez et al. | |
| 4,734,858 A | 3/1988 | Schlafly | 705/26 |
| 5,107,419 A | * 4/1992 | MacPhail | 707/9 |
| 5,283,887 A | * 2/1994 | Zachery | 707/513 |
| 5,299,305 A | * 3/1994 | Oomae et al. | 707/506 |
| 5,438,657 A | * 8/1995 | Nakatami | 707/506 |
| 5,485,369 A | 1/1996 | Nicholls et al. | 705/9 |
| 5,490,242 A | * 2/1996 | Tamura | 707/513 |
| 5,566,289 A | * 10/1996 | Ikeo et al. | 707/517 |
| 5,608,874 A | * 3/1997 | Ogawa et al. | 709/246 |
| 5,708,828 A | * 1/1998 | Coleman | 707/523 |
| 5,732,400 A | 3/1998 | Mandler et al. | 705/26 |
| 5,778,359 A | * 7/1998 | Stent | 707/4 |
| 5,781,914 A | * 7/1998 | Stork et al. | 707/506 |
| 5,860,073 A | * 1/1999 | Ferrel et al. | 707/522 |
| 5,909,492 A | 6/1999 | Payne et al. | 705/78 |
| 5,918,238 A | * 6/1999 | Hayashi | 707/526 |
| 5,956,033 A | * 9/1999 | Tee et al. | 345/349 |
| 5,963,966 A | * 10/1999 | Mitchell et al. | 707/513 |

OTHER PUBLICATIONS

Lie, Hakon et al., "Cascading Style Sheets, Lveve 1", W3C Recommendation, REC–CSS1–961217, http://www.w3.org/TR/REC–CSS!–961217, Dec. 17, 1996, pp 1–69.*
Lovegrove, William et al., "Text Block Recognition From TIFF Images", 1995 IEE, Savoy Place, London WC2R OBL, UK, pp 1–4, 1995.*

* cited by examiner

*Primary Examiner*—Hosain T. Alam
*Assistant Examiner*—Jean Bolte Fleurantin
(74) *Attorney, Agent, or Firm*—Jung-hua Kuo

(57) ABSTRACT

A computer implemented method of converting a document in an input format to a document in a different output format is disclosed. The method generally comprises locating data in the input document, grouping data into one or more intermediate format blocks in an intermediate format document, and converting the intermediate format document to the output format document using the intermediate format blocks. Each intermediate format block may be a paragraph, a line, a word, a table, or an image. The input document may be received over a network and the output document is sent over the network. A linked table of contents and/or an index may be generated. A computer executable program may be generated and inserted into the output document for selecting one output format for display. The output document may be displayed by locating sub-page breaks in the document, subdividing the document into sub-pages using the sub-page breaks, locating blocks within each sub-page, and sequentially displaying all or a portion of each block of the sub-pages within display parameters of a display configuration. Tables may be divided to be displayed in more than one display page. The converter may be incorporated in a computer program product for maintaining a repository of input documents in one or more storage formats.

26 Claims, 26 Drawing Sheets

- We are reiterating our recommendation on the shares of SVRN and raising our price target to $14 from $12.

- Resolution of the BLDGE insurance tipped has likely positive implications for SVRN 1. Lower Insurance Costs Adds $1.15 in Earnings Power. The Federal legislation passed on September 11 lowers SVRN's deposit insurance cost to 80% of its deposits. SAIF lowered in 5.6 cents per $200 in deposits from 23 cents. Although this charge should result in a one-time charge of approximately $425 per fully diluted shares, we also think the new reduced annual estimate to add roughly $1.15 in earnings power to SVRN. The SAIF charge of roughly 6.63 cents per $100 in deposits of $0.38 per share upls we] see less than the assumed charge of $0.32 per share of 80 cents per $100.

2. Possible Goodwill Write-Off Adds $0.57 in Earnings Power. Now that SVRN is able to accurately measure the improvement of leisure etplat its assess rains gai acquired deposits, it is considering writing off up to $54 million in goodwill (after tax). The write-off of this goodwill would lower amortization expenses and add up to $0.60[0]dds] slight to SVRN.

Sovereign Bancorp is a thrift banking company headquartered in Wyomissing, Pennsylvania, a suburb of Reading. Sovereign is the fourth-largest thrift company in Philadelphia.

Ranking Legend
1—Buy
2—Outperform
3—Hold
4—Underperform
5—Sell

ERLKEIS

Bug#: 4528
Product: Monarch Warehouse
Report Type: CLIENT
Reported By: Janice
Method: ad_hoc
Status 32: Development Active
Associated Files:
Bug Title: Process is listed in Uncommitted when not processed
Bug Description:

ID #:
Entry Date: 7/1/97
Version: 101-06/24
Reproduced in: 32 Bit
LVT 16 Bit: n/a
LVT 32 Bit: 101-06/24
Status16: n/a
Comments:

Entered by: Janice
Priority: 4

○ Crash
○ Corrupt Data
● Functional
○ Functional WA
○ Cosmetic

Fixed Version 16
Fixed Version 32

| INDICATES Xi

MICRON
SDFSDKSD

8 MEG x 8
FPM DRAM

DRAM

MT4LC8M8E1, MT4LC8M8B6

*For the latest full-length data sheet, please refer to the Micron Web site: www.micron.com/mb/msp/html/datasheet.html*

FEATURES
- Single +3.3V ±0.3V power supply
- Industry-standard x8 pinout, timing, functions and packages
- 13 row, 10 column addresses (E1) or 12 row, 11 column addresses (B6)
- High-performance CMOS silicon-gate process
- All inputs, outputs and clocks are LVTTL-compatible
- PAST PAGE MODE (FPM) access
- 4,096-cycle CAS#-BEFORE-RAS# (CBR) REFRESH distributed across 64ms

*FIG. 21A*

- Optional self refresh (S) for low-power data retention

| OPTIONS | MARKING |
|---|---|
| • Refresh Addressing | |
| 4,096 (4K) rows | B6 |
| 8,102 (8K) rows | E1 |
| • Plastic Packages | |
| 32-pin SOJ (400 mil) | DJ |
| 32-pin TSOP (400 mil) | TG |
| • Timing | |
| 50ns access | -5 |
| 60ms access | -6 |
| • Refresh Rates | |
| Standard Refresh (32ms period) | None |
| Self Refresh (128ms period) | S* |

NOTE: 1. The 8 Meg x 8 FPM DRAM base number differentiates the offerings in one place = MT4LC8M8E1. The fifth field distinguishes various options: E1 designates an 8K refresh and B6 designates a 4K refresh for FPM DRAMs.
  2. The # symbol indicates signal is active LOW
* Contact factory for availability

KEY TIMING PARAMETERS

| SPEED | $^1$RC | $^1$RAC | $^1$PC | $^1$AA | $^1$CAC |
|---|---|---|---|---|---|
| -5 | 90ns | 50ns | 30ns | 25ns | 13ns |
| -8 | 110ns | 60ns | 35ns | 30ns | 15ns |

*FIG. 21B*

GENERAL DESCRIPTION

The MT4LC8M8E1 and MT4LC8M8B6 are high-speed CMOS dynamic random-access memory devices containing 67,108,864 bits organized in a x8 configuration. The MT4LC8M8E1 and MT4LC8M8B6 are functionally organized as 8,388,608 locations containing eight bits each. The 8,388,608 memory locations are arranced in 8,192 rows by 1,024 columns for the MT4LC8M8E1 or 4,096 rows by 2,048 columns for the MT4LC8M8B6. Curing READ or WRITE cycles, each locations is uniquely addressed via the address bits. First, the row address is latched by the RAS# signal, then the column address by CAS#. Both devices provide FAST-PAGE-MODE operation, allowing for fast sucessive data operations (READ, WRITE or READ-MODIFY-WRITE) within a given row.

The MT4LC8M8E1 and MT4LC8M8B6 must be refreshed periodically in order to retain stored data.

FIG. 21C

PIN ASSIGNMENT (Top View)

32-Pin SOJ
(A-1)

| WT | 1* | 17 | ST |
| DWS | 2 | 18 | DQT |
| MNM | 3 | 19 | NQT |
| DES | 4 | 20 | DQS |
| DWQ | 5 | 21 | DQR |
| NG | 6 | 22 | VDS |
| WT | 7 | 23 | FEL |
| SWT | 8 | 24 | DES |
| RMA | 9 | 25 | ANET |
| AC | 10 | 26 | AST |
| AF | 11 | 27 | SDF |
| AS | 12 | 28 | AB |
| AT | 13 | 29 | SF |
| AK | 14 | 30 | SD |
| AD | 15 | 31 | DS |
| SS | 16 | 32 | SD |

32-Pin TSOP
(C-1)

| WT | 1* | 17 | ST |
| DWS | 2 | 18 | DQT |
| MNM | 3 | 19 | NQT |
| DES | 4 | 20 | DQS |
| DWQ | 5 | 21 | DQR |
| NG | 6 | 22 | VDS |
| WT | 7 | 23 | FEL |
| SWT | 8 | 24 | DES |
| RMA | 9 | 25 | ANET |
| AC | 10 | 26 | AST |
| AF | 11 | 27 | SDF |
| AS | 12 | 28 | AB |
| AT | 13 | 29 | SF |
| AK | 14 | 30 | SD |
| AD | 15 | 31 | DS |
| SS | 16 | 32 | SD |

* A12 ON C1 dksifjdkjfi NC or XT dfkdsifdfk

FIG. 21D

8 MEG x 8 FPM DRAM PART NUMBERS

| PART NUMBER | REFRESH ADDRESSXX G | PACKAGE | REFRESH |
|---|---|---|---|
| MT4LC8M8E1DJ-x | 8K | SOJ | Standard |
| MT4LC8M8E1DJ-x S | 8K | SOJ | Self |
| MT4LC8M8E1TG-x | 8K | TSOP | Standard |
| MT4LC8M8E1TG-x S | 8K | TSOP | Self |
| MT4LC8M8E1DJ-x | 4K | SOJ | Standard |
| MT4LC8M8E1DJ-x S | 4K | SOJ | Self |
| MT4LC8M8E1TG-x | 4K | TSOP | Standard |
| MT4LC8M8E1TG-x S | 4K | TSOP | Self |

X = speed

B dlsdl d f skdlkjfd Rskdlfklj DSFdlkdls lkldsjlksldjgl

Tlelfkj Tldklslkdlsj, incl. SFDLKFDSJJFDS slkd lsdlklsd to fslkjlsdlkj fdslkjldslkjfds
  d sdflkjfds fdsfldsflds jkljkl
  lsldlkjsldlkjldslkjl dlskJldjdfs slladlksldlsld sldlkjlsdlkjdsf

*FIG. 21E*

ORIGINAL TABLE

| Vendor | Product | Shipments (000) | Share (%) | Revenues ($M) | Share (%) |
|---|---|---|---|---|---|
| Microsoft | FrontPage 98 | 1,000 | 1,000 | 1,000 | 1,000 |
| Trellix | Trellix 2.0 | 1,000 | 1,000 | 1,000 | 1,000 |
| Adobe | PageMill 3.0 | 1,000 | 1,000 | 1,000 | 1,000 |
| Allaire | HomeSite 4.0 | 1,000 | 1,000 | 1,000 | 1,000 |
| NetObjects | Fusion 4.0 | 1,000 | 1,000 | 1,000 | 1,000 |
| SoftQuad | HoTMetaL Pro 5.0 | 1,000 | 1,000 | 1,000 | 1,000 |
| Macromedia | Dreamweaver 2.0 | 1,000 | 1,000 | 1,000 | 1,000 |
| FileMaker | HomePage 3.0 | 1,000 | 1,000 | 1,000 | 1,000 |
| Other | — | 1,000 | 1,000 | 1,000 | 1,000 |
| Total | — | 1,000 | 1,000 | 1,000 | 1,000 |

*FIG. 22*

REFORMATTED TABLE

| Vendor | Product | Shipments (000) |
|---|---|---|
| Microsoft | FrontPage 98 | 1,000 |
| Trellix | Trellix 2.0 | 1,000 |
| Adobe | PageMill 3.0 | 1,000 |
| Allaire | HomeSite 4.0 | 1,000 |
| NetObjects | Fusion 4.0 | 1,000 |
| SoftQuad | HoTMetaL Pro 5.0 | 1,000 |
| Macromedia | Dreamweaver 2.0 | 1,000 |
| FileMaker | HomePage 3.0 | 1,000 |
| Other | — | 1,000 |
| Total | — | 1,000 |

*FIG. 23A*

REFORMATTED TABLE

| Vendor | Share (%) | Revenues ($M) | Share (%) |
|---|---|---|---|
| Microsoft | 1,000 | 1,000 | 1,000 |
| Trellix | 1,000 | 1,000 | 1,000 |
| Adobe | 1,000 | 1,000 | 1,000 |
| Allaire | 1,000 | 1,000 | 1,000 |
| NetObjects | 1,000 | 1,000 | 1,000 |
| SoftQuad | 1,000 | 1,000 | 1,000 |
| Macromedia | 1,000 | 1,000 | 1,000 |
| FileMaker | 1,000 | 1,000 | 1,000 |
| Other | 1,000 | 1,000 | 1,000 |
| Total | 1,000 | 1,000 | 1,000 |

*FIG. 23B*

CONVERSION DATA REPRESENTING A DOCUMENT TO OTHER FORMATS FOR MANIPULATION AND DISPLAY

CROSS REFERENCE TO RELATED APPLICATIONS

This application claims priority to U.S. Provisional Patent Application Ser. No. 60/102,688 filed on Oct. 1, 1998 and entitled "Processor-Based Method for Converting and Outputting Digital Data Representing a Document Image," the entirety of which is incorporated by reference herein.

BACKGROUND OF THE INVENTION

1. Field of the Invention

The present invention relates generally to a method for converting a document stored in one format to a different format. More specifically, a system and method for converting digital data representing an image of a document image stored in one format to other formats for manipulation and display are disclosed.

2. Description of the Related Art

Automatic processing of digital data representing an image of a document using a digital computer to recognize, capture and/or store information contained in the document has been the subject of active research and commercial products. For example, U.S. Pat. No. 5,737,442 issued on Apr. 7, 1998 to H. Alam discloses a processor based method for recognizing, capturing and storing tabular data from digital computer data representing a document, the disclosure of which is incorporated herein by reference in its entirety.

However, many other image processing research and products have not focused on the accurate, efficient and automatic capturing of the information contained in a document and converting the document to a different format to be displayed, for example. Nor have other image processing research and products focused on allowing the user to manually or otherwise reformat and/or revise the contents of the document. Further, such image processing research and products have also not focussed on the conversion of such information to a format that a user may easily manipulate in order to utilize all or a portion of the information contained in the document and/or to reformat the document as desired into a different layout. For example, it may be desirable for the user to manipulate the document by cutting, pasting and/or otherwise editing or revising the document to reformat and/or to fully or partially utilize the information contained in the document such as for analysis and/or other uses.

What is needed are accurate and efficient systems and methods for converting a document stored in one format to a different format. Such systems and methods preferably convert digital data representing an image of a document image stored in one format to other formats for manipulation and display, for example.

SUMMARY OF THE INVENTION

The present invention comprises a method for extracting data from digital data representing a document, such as a printed document or of an Internet webpage. The method generally comprises locating words from the digital data of the document in the original or input format, joining the located words into lines, joining the lines into paragraphs, locating tables from the joined paragraphs, converting the paragraphs and tables to an intermediate format, and outputting the information into an output format. The input and output formats may be, for example, portable document format (PDF), rich text format (RTF), hypertext markup language (HTML) format with style sheets, tabular HTML, extensible markup language (XML), cascading style sheets (CSS), Netscape Layers, linked and separate pages, Tag Image File Format (TIFF) or any other image format such as graphics interchange format (GIF), bit map (BMP), or Joint Photographic Experts Group (JPEG), formats generated by text and/or image authoring tools or applications, or any other suitable formats.

A computer implemented method of converting a document in an input format to a document in a different output format is disclosed. The method generally comprises locating data in the input document, grouping data into one or more intermediate format blocks in an intermediate format document, and converting the intermediate format document to the output format document using the intermediate format blocks. Preferably, the grouping includes locating words in the input document, joining words satisfying line threshold to into lines, joining lines satisfying paragraph threshold into paragraphs, and locating tables. The grouping may alternatively or further include locating tags (or control characters) in the input document and utilizing the tags in locating words, joining words into lines, joining lines into paragraph, and locating tables. Each intermediate format block may be selected from a word, a line, a paragraph, a table, and an image.

Each of the input format and output format may be in portable document format (PDF), rich text format (RTF), hypertext markup language (HTML), extensible markup language (XML), cascading style sheets (CSS), Netscape Layers, linked and separate pages, Tag Image File Format (TIFF), graphics interchange format (GIF), bit map (BMP), Joint Photographic Experts Group (JPEG), MICROSOFT WORD™, WORD PERFECT™, AUTOCAD™, and POWER POINT™.

In one embodiment, the input document is received over a network and the output document is sent over the network, the network may be the Internet or an intranet, for example, via electronic mail. Heading of the input document may be located to generate a linked table of contents page containing the headings, each table of contents heading containing a link to the heading contained in the output document, the table of contents page being placed into the output document.

In another embodiment, a computer executable program, such as a JAVA™ script, may be generated for selecting one output format for displayed, the program being inserted into the output document.

The methods of the present invention may be implemented by computer codes stored on a computer readable such as CD-ROM, zip disk, floppy disk, tape, flash memory, system memory, hard drive, and data signal embodied in a carrier wave.

The output document, for example, may be displayed by locating sub-page breaks in the document, subdividing the document into sub-pages using the sub-page breaks, locating blocks within each sub-page, and sequentially displaying all or a portion of each block of the sub-pages within display parameters of a display configuration. Tables may be divided to be displayed in more than one display page. A linked table of contents and/or a linked index may also be generated.

In another embodiment, the converter may be incorporated in a computer program product for maintaining a repository of input documents in one or more storage formats. A table of contents and/or an index may also be generated.

BRIEF DESCRIPTION OF THE DRAWINGS

FIG. 15A shows a page of a sample document illustrating intermediate format blocks;

FIGS. 15B and 15C illustrate division of the sample document page of FIG. 15A into cells of a macro table;

FIG. 17 shows a page of a sample document illustrating the partitioning of a non-divisible cell of a macro table to generate a highest common factor coordinate table for placement of each block within the cell at a corresponding coordinate within the coordinate table;

FIGS. 21A–F show five display pages into which the sample document of FIG. 20 may be divided;

FIG. 22 shows a sample table which may be contained in a document;

FIGS. 23A and 23B show sample display pages by which the table shown in FIG. 22 may be displayed;

DETAILED DESCRIPTION OF THE PREFERRED EMBODIMENTS

The present invention comprises systems and methods for converting digital data representing an image of a printed document in an original or input format to a different output format. The following description is presented to enable any person skilled in the art to make and use the invention. Descriptions of specific applications are provided only as examples. Various modifications to the preferred embodiment will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
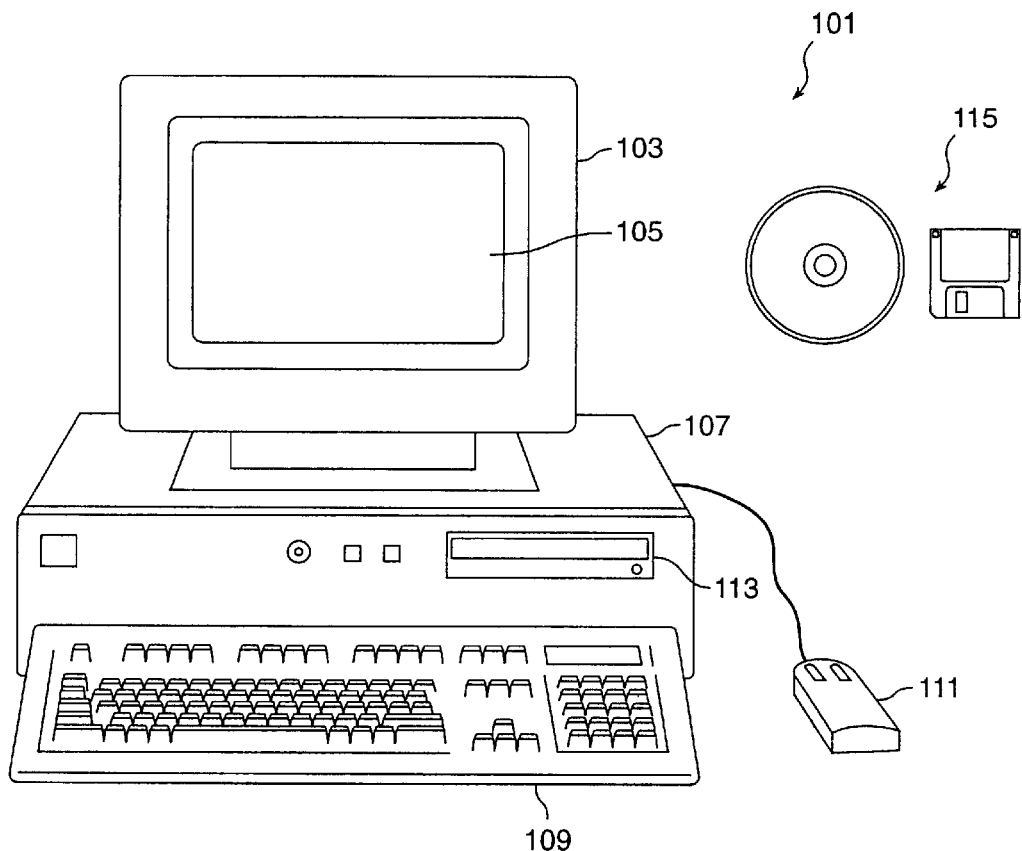
FIG. 1 illustrates an example of a computer system that can be utilized to execute software of an embodiment of the present invention.

FIG. 1 illustrates an example of a computer system 101 that can be used to execute the software of an embodiment of the invention. FIG. 1 shows a computer system 101 that includes a display 103, screen 105, cabinet 107, keyboard 109, and mouse 111. Mouse 111 can have one or more buttons for interacting with a graphical user interface. Cabinet 107 houses a CD-ROM, zip, and/or floppy disc drive 113, system memory and a hard drive (see FIG. 2) which can be utilized to store and retrieve software programs incorporating computer code that implements the invention, data for use with the invention, and the like. Although CD-ROM, zip, and floppy disc 115 are shown as exemplary computer readable storage mediums, other computer readable storage media including tape, flash memory, system memory, and hard drive can be utilized. Additionally, a data signal embodied in a carrier wave, such as in a network including the Internet or an intranet, can be the computer readable storage medium.

Figure 2:
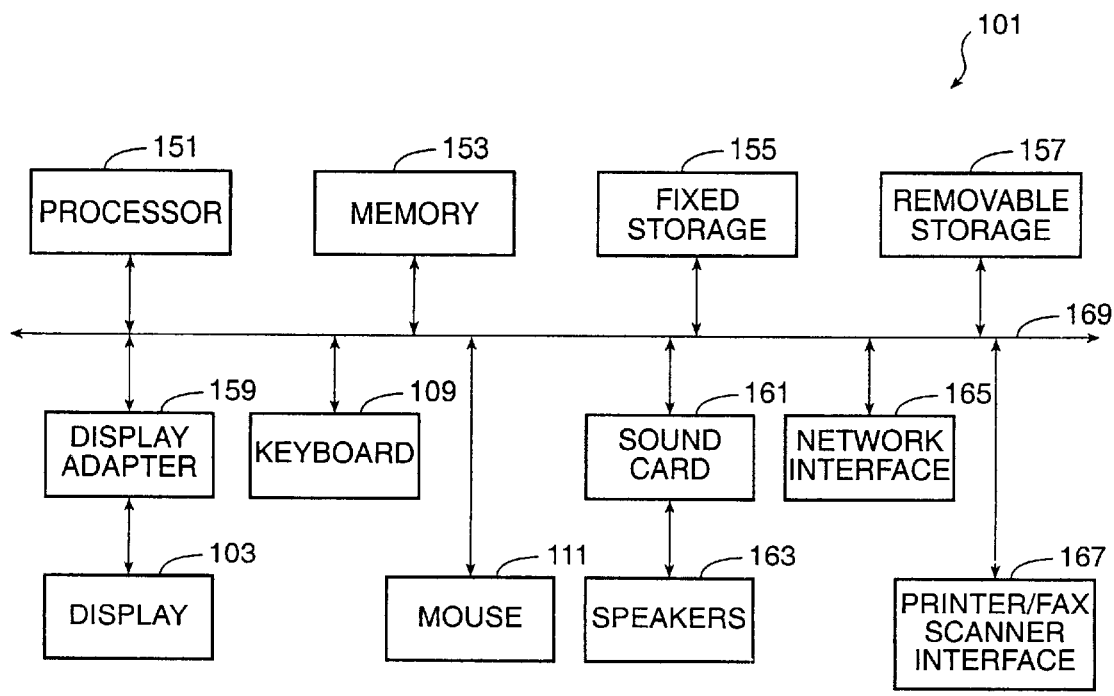
FIG. 2 is a system block diagram of the computer system of FIG. 2.

FIG. 2 is a system block diagram of computer system 101 used to execute the software of an embodiment of the invention. As in FIG. 1, computer system 101 includes monitor 103 and keyboard 109, and mouse 111. Computer system 101 further includes subsystems such as a central processor 151, system memory 153, fixed storage 155 (such as a hard drive and random access memory), removable storage 157 (such as a CD-ROM, zip or floppy disc drive), display adapter 159, sound card 161, speakers 163, network interface 165, and printer, facsimile, and/or scanner interface 167. Other computer systems suitable for use with the invention can include additional or fewer subsystems. For example, another computer system could include more than one processor 151 (such as a multi-processor system) or a cache memory.

The system bus architecture of computer system 101 is represented by arrows 169. However, these arrows are illustrative of any interconnection scheme serving to link the subsystems. For example, a local bus could be utilized to connect the central processor to the system memory and display adapter. Computer system 101 shown in FIG. 2 is but an example of a computer system suitable for use with the invention. Other computer architectures having different configurations of subsystems can also be utilized.

Figure 3:
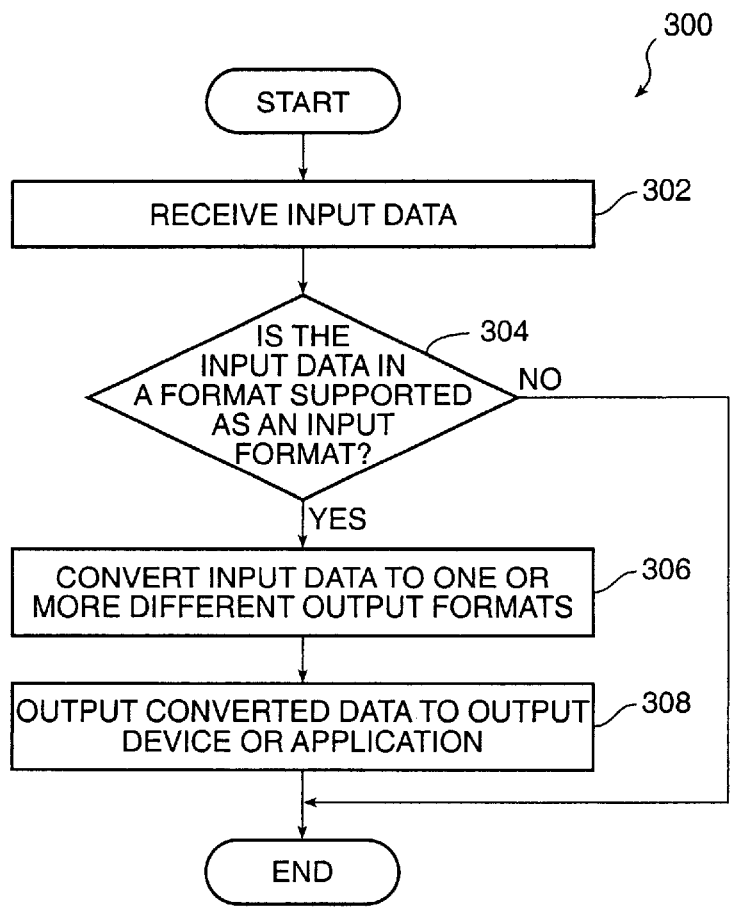
FIG. 3 is a flow diagram illustrating the overall method for converting data representing a document from an original input format to a different output format.

FIG. 3 is a flow diagram illustrating a method 300 for converting data representing a document from an original input format to a different output format. Conversion method 300 includes receiving input data at step 302. The step of receiving input data may be achieved by receiving or reading data from a computer readable storage medium, such as those listed above, including CD-ROM, zip, floppy disk, tape, flash memory, system memory, hard drive, data signal embodied in a carrier wave. The data signal embodied in a carrier wave may be a carrier wave in a network including the Internet or an intranet, or a carrier wave delivered via a computer port, such as a parallel, serial, or Universal Serial Bus (USB) printer port, including data signal delivered via a facsimile machine and/or a scanner.

Method 300 then determines whether the input data is in a format supported as an input format at step 304. The supported input formats are preferably same as those available as output formats although the input formats may include fewer, more, or any combination or subset of output formats. For example, in certain circumstances, it may be desirable to support or allow many different input formats while allowing only one specific output format. The supported input and/or output formats may include one or more versions of HTML, XML, PDF, RTF, CSS, Netscape Layers, linked and separate pages, Tag Image File Format (TIFF) or any other image format, formats generated by text and/or image authoring tools or applications, or any other suitable formats.

If at a step 304, it is determined that the input data is in a format supported as an input format, then the input data is converted to one or more output formats different from the original input format at a step 306. The one or more output formats may be specified by the user, all of one or more output formats supported by method 300, and/or determined based upon the application or device to which the converted data output is outputted. For example, the output device may be a portable digital assistant (PDA) which supports one or more of the output formats supported by method 300.

Alternatively, if at a step 304, it is determine that the input data is not in a format supported as an input format, then method 300 terminates without converting the input data. Method 300 may also output an error message indicating that the input data is not in a format supported as an input format.

Figure 4:
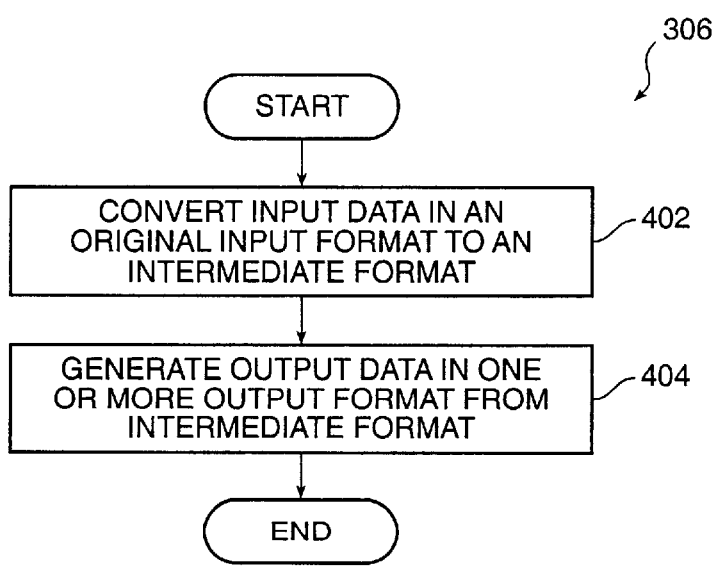
FIG. 4 is a flow diagram illustrating a step of converting the input data to a different output format.

FIG. 4 is a flow diagram illustrating an embodiment of step 306 of converting the input data to a different output format. Step 306 comprises converting the input data to an intermediate format at a step 402. The intermediate format is then used to generate the output data in one or more output formats at step 404.

Figure 5:
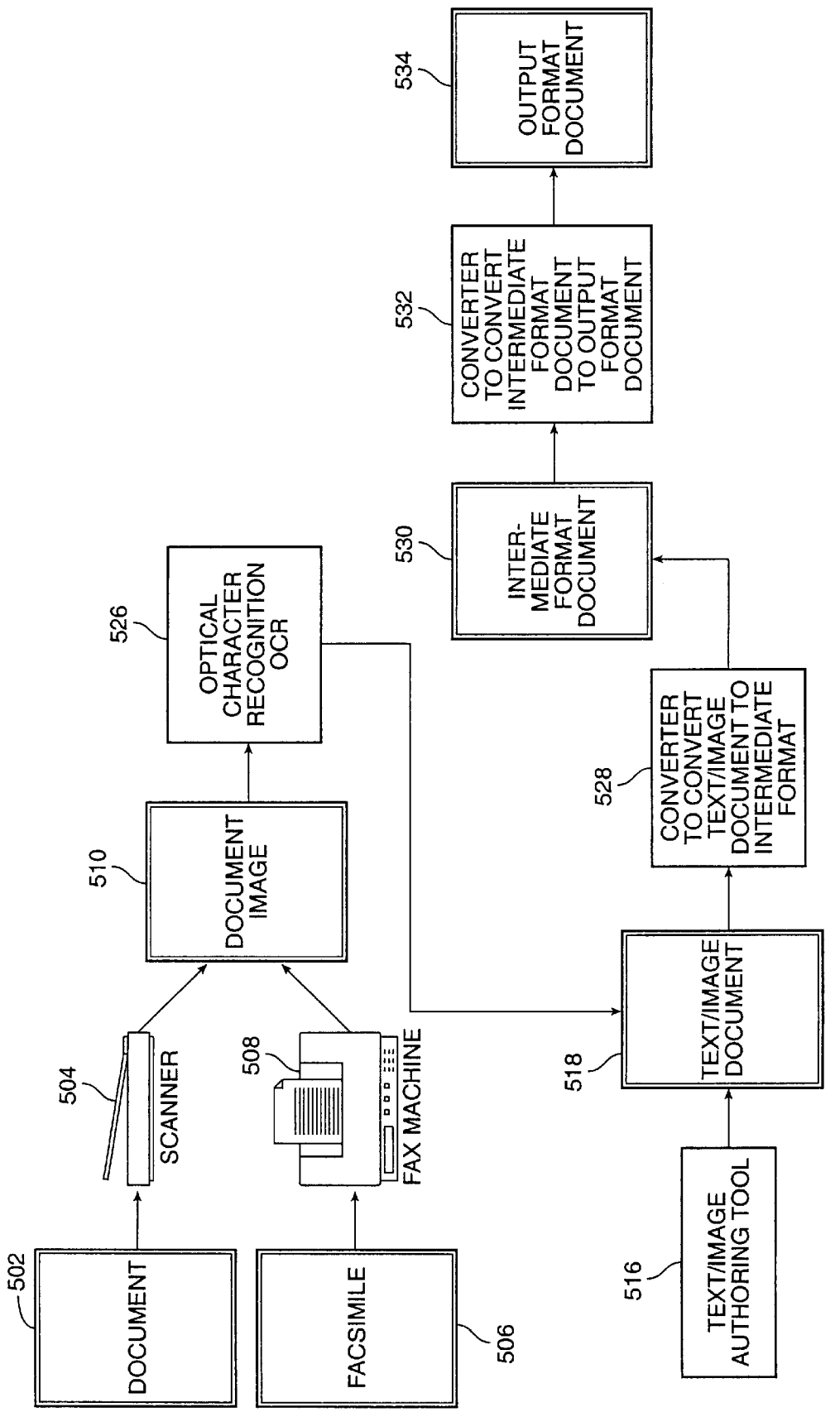
FIG. 5 is a schematic illustrating conversion of data representing a document to a different output format.
Figure 6:
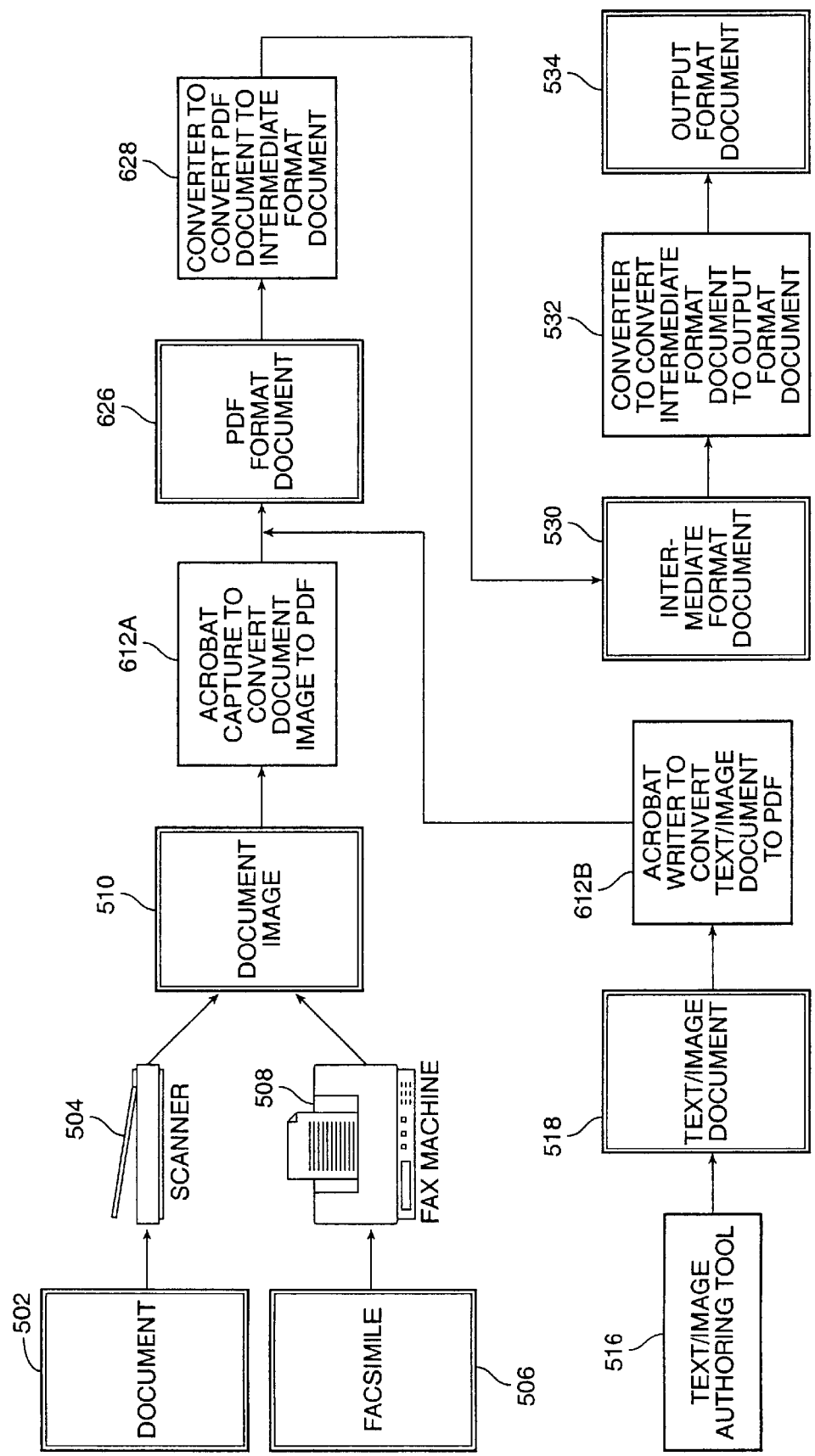
FIG. 6 is a schematic illustrating conversion of data representing a document to portable document format, to an intermediate format, and finally to a different output format.

FIGS. 5 and 6 are schematics illustrating an embodiment of converting data representing a document to a different output format. FIG. 5 illustrates conversion of data representing a document to an intermediate format and then to a different output format and FIG. 6 illustrates conversion of data representing a document to PDP, to an intermediate format, and finally to a different output format.

As shown in FIG. 5, a document 502 may be scanned by a scanner 504 or a facsimile 506 may received by a facsimile machine 508. Each of scanner 504 and facsimile machine 508 outputs data 510 representing the image of document 502 to an optical character recognition (OCR) application 526. OCR application software is known in the art and is commercially available off-the-shelf. OCR application 526 converts document image data 510 representing the image of document 502 or facsimile 506 to a document 518 in a format such as a format generated by a text or image authoring tool.

Alternatively, a text and/or image authoring tool 516 may be utilized to create a text and/or image document 518. Text and/or image authoring tool 516 may be, for example, any word processing application such as MICROSOFT WORD™, WORD PERFECT™, any text and drawing authoring applications such as AUTOCAD™, POWER POINT™, and/or any other suitable text and/or image authoring tools. Text/image document 518 is output to a document converter 528 which converts text and/or image document 518 to an intermediate format document 530. Converter 528 is in essence a document translator that may be incorporated into, for example, a printer driver such that the data received from sources such as a scanner or a facsimile machine may be converted directly to a document in the intermediate format.

Intermediate format document 530 is received by a converter 532 which converts intermediate format document 530 to an output format document 534. The output format may be, for example, HTML or XML and output format document 534 may be output to an output application or device, such as INTERNET EXPLORER™ or NETSCAPE™. The conversion of a document to an intermediate format will be discussed in more detail with reference to FIGS. 7–10.

In another embodiment as shown in FIG. 6, document image 510 and text and/or image document 518 are input to ACROBAT CAPTURE™ application software 612A and ACROBAT WRITER™ application software 612B, respectively, each of which outputs a PDF document 626. Application programs ACROBAT CAPTURE™ and ACROBAT WRITER™ are software products commercially available from Adobe Systems. PDF document 626 is received by a converter 628 which converts the PDF document to an intermediate format document 530. The intermediate format document is output to converter 532 which converts intermediate format document 530 to an output format document 534. As noted above, the output format may be, for example, HTML or XML and the output format document 534 may be output to an output application or device, such as INTERNET EXPLORER™ or NETSCAPE™.

The intermediate format is preferably a format that can be easily utilized to transfer the data representing the contents of the documents to any other desired output format. In essence, the intermediate format serves as a document translator. The intermediate format document preferably includes information including characters and their fonts (including italics), sizes, weights (bold or normal), underlines, and locations within a document. The intermediate format document preferably groups characters into words, lines, paragraphs, and/or tables. Each group is stored in the intermediate format document as an intermediate format block. The intermediate format block may also store an image or other grouped or blocked portion of the input document. The intermediate format preferably also retains information on bookmarks, document links, raster images and vector images contained in the input document. Further, the intermediate format preferably retains or transfers any embedded animation, sounds and/or music, as well as the execution of links to start up other applications. For example, the intermediate format may be a listing of the intermediate format blocks along with their X and Y coordinates.

Each intermediate format block may be an image, a paragraph, an element in a table, or all or a portion of the table, depending upon the spacing of the elements of the table. The information stored in the intermediate format can be easily converted to the desired output format.

Figure 7:
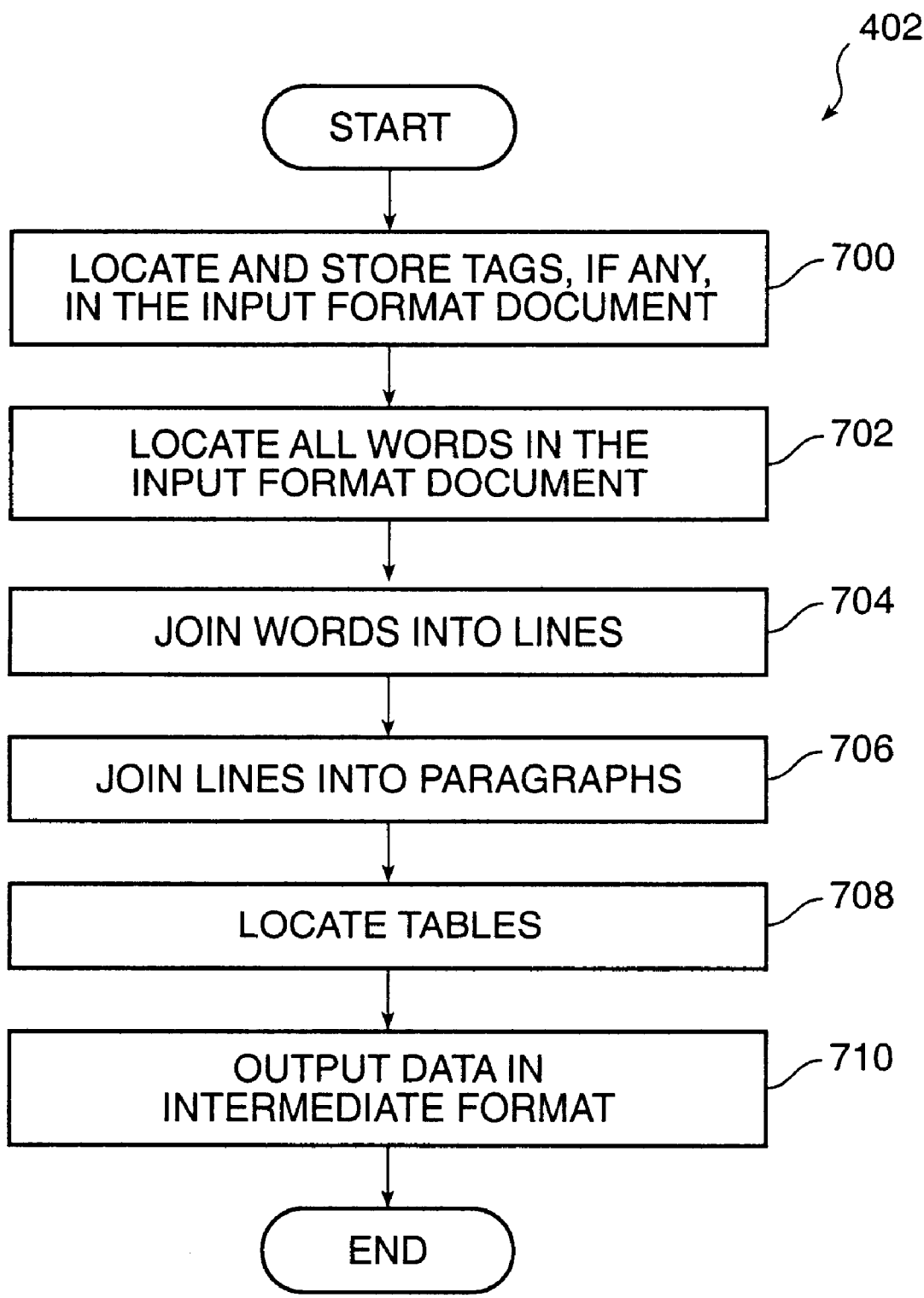
FIG. 7 shows a flow diagram illustrating extracting data from an image of a document to convert the data to the intermediate format.

The overall process of converting to the intermediate format having been described, the details of the conversion process will now be described. FIG. 7 shows a flow diagram illustrating an embodiment of step 402 of extracting data from an image of a document and convert the data to the intermediate format. Step 402 includes locating and storing tags in the input format document at a step 700, locating words from the digital data at a step 702, joining the located words into lines at step 704, joining the lines into paragraphs at a step 706, locating tables from the joined paragraphs at a step 708, and outputting the intermediate format data generated from steps 702, 704, 706, and 708 at step 710. Details of each of steps 702, 704, 706, and 708 are discussed in more detail below.

Step 700: Locate and Store Tags in Input Format Document

Text representation of documents in certain formats, such as WORD™, may contain tags (or control characters). The process may first recognize the input format, such as WORD™, of the input document. If the tags of the input document are recognizable, then dictionary tags for that input format or type may be utilized to translate the located tags into the intermediate format.

Each tag may be associated with a specific portion of the document. Tags generally contain information about the specific portion such as identification as a heading, a table, a paragraph or a list and/or other information such as alignment, font, etc. Step 700 thus locates and stores the tags, if any, and the associated information contained therein. The tags may be complete or the tags may be incomplete tags and do not provide complete information about the specific portion of the document. The tags may be utilized to facilitate execution of subsequent steps, such as steps 702, 704, 706 and 708. If results of such subsequent steps conflict with the information contain in the tags, the results from the steps preferably supersede or replace the information in the tags. In other words, tags are preferably used as baseline or default results or settings. Alternatively, if the tags are complete, the process may bypass steps 702, 704, 706 and 708.

Documents in certain other formats, such as PDF, do not contain tags. In such case, results from the subsequent steps, such as steps 702, 704, 706 and 708, are used to obtain the information which would otherwise be contained in the tags. The subsequent steps utilize the layout information (i.e., image representation) of the text to of the document locate words, lines, paragraphs, and tables, for example.

Step 702: Locate Words in Input Format Document

In locating words from digital data representing an image of a document at step 702, the digital computer utilizes information provided for each word by the digital data in an input format. The information provided by the digital data in the original input format may include, for example, X and Y coordinates for the top left and bottom right of the word relative to the page as well as the font of the word. The font information includes information on the style, size, weight (bold or non-bold), stroke (italics or non-italics) and orientation of the word. For purposes of discussion only, the X axis is assumed to extend along the width (horizontal direction) of a page and the Y axis is assumed to extend along the length (vertical direction) of the page, in either portrait or landscape orientation. The individual words are then sorted by their X and Y coordinates, preferably first by the Y coordinate in the vertical direction and then by the X coordinate in the horizontal direction. However, the precise method by which the words are sorted may be varied.

Step 704: Join Words into Lines

Figure 8:
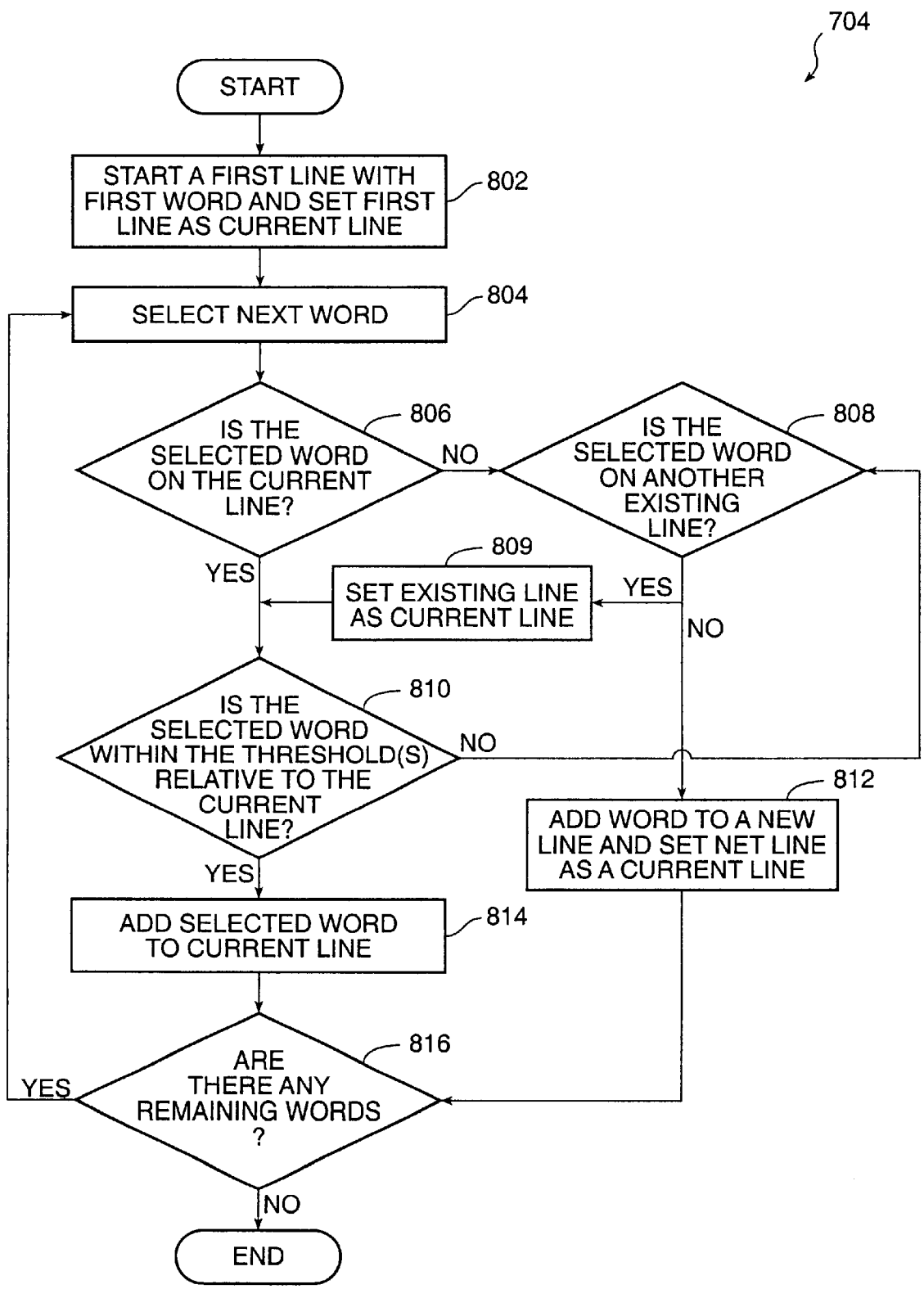
FIG. 8 shows a flow diagram illustrating the process steps for joining words into lines.

FIG. 8 shows a flow diagram illustrating step 704 of joining the located and sorted words into lines. To join the located and sorted words into lines, the first word from the listed of sorted words is assigned to a first line at step 802. This first line may be defined as the current line. A next word is then picked or selected at step 804.

A determination is made whether the selected word is in the current line at step 806. To determine whether the selected word is in the current line, the appropriate Y coordinate(s), i.e., in the vertical direction, of the selected word are compared with the appropriate Y coordinate(s) of the previous word in the current line to determine whether certain line parameters and/or thresholds are satisfied. For example, the top Y coordinate of the selected word may be compared with the top Y coordinate of the previous word in the current line to determine the inter-word spacing in the Y direction. If the inter-word spacing or distance in the Y direction is greater than a threshold of, for example, 10% of the average character height, then the inter-word spacing parameter in the Y direction is not met and the word is determined not to be in the current line. The average character height may be determined from the words in the current line or from all the words in the document, for example. Of course, other suitable comparisons and/or analysis may be made by step 806 to determine whether the selected word is in the current line.

If at a step 806, it is determined that the selected word is not in the current line, step 808 determines whether the word is in any existing line, i.e., a line having at least one word assigned thereto. This may be determined with an analysis similar to those described above with reference to step 806. For example, if an upper and/or lower Y coordinate is assigned to each existing line, a determination may be made of whether the upper and/or lower Y coordinate of the selected word falls within a threshold distance above or below the upper and/or lower Y coordinate of any other existing lines. The line threshold distance may be, for example, 10% of the average character height. Alternatively, a determination may be made of whether the upper and/or lower Y coordinates of the selected word fall within a threshold distance above or below the upper and/or lower Y coordinates of one or more words on the other existing lines. The comparison of the Y coordinates is repeated for each of the other existing lines until all of the other existing lines are examined or until the selected word is determined to be in an existing line. If it is determined that the selected word is in an existing line, then that existing line is defined as the current line at step 809.

After step 806 determines that the selected word is in the current line or after another existing line is set as the current line at step 809, step 810 determines whether the selected word is within a certain threshold distance or spacing. For example, the appropriate X coordinate of the current selected word is compared with the appropriate X coordinate of the previous word in the current line to determine whether the distance between the words in the X (horizontal) direction are within the threshold distance. In particular, the top left X coordinate of the selected word may be compared with the bottom right X coordinate of the left-most and/or right-most word to determine the spacing between the words in the X direction. If the inter-word spacing in the X direction is greater than a threshold distance, for example, 2.5 times the character width or 2.5 times the average character width, then the inter-word spacing threshold is exceeded and the selected word is determined not to be in the current line. The threshold inter-word spacing in the X direction may be a statistic of the inter-word spacing and may be dynamically determined. Two words positioned approximately at the same vertical position on a page may not be on the same line, for example, when the words are positioned in different columns with spacing between the columns.

If step 808 determines that the selected word is not on another existing line, a new line is started at step 812 by adding the selected word to a new line. The new line is then defined as the current line. Otherwise, if step 810 determines that the selected word is not within the threshold distance, the process continues from step 808 to determine if the selected word is on another existing line.

If step 810 determines that the selected word is within the threshold distance, then the selected word is added to the current line at step 814. After either step 812 or step 814 adds the selected word to the current line or to a new line, step 816 determines whether there are any remaining words in the sorted list of words, i.e., words that remain unassigned to a line. If there are any remaining words unassigned to a line, the process continues from step 804 to select a next word. If step 816 determines that all words have been assigned to a line, the process of joining words into lines is complete.

Illustration of Joining Words Into Lines At step 704

Figure 9:
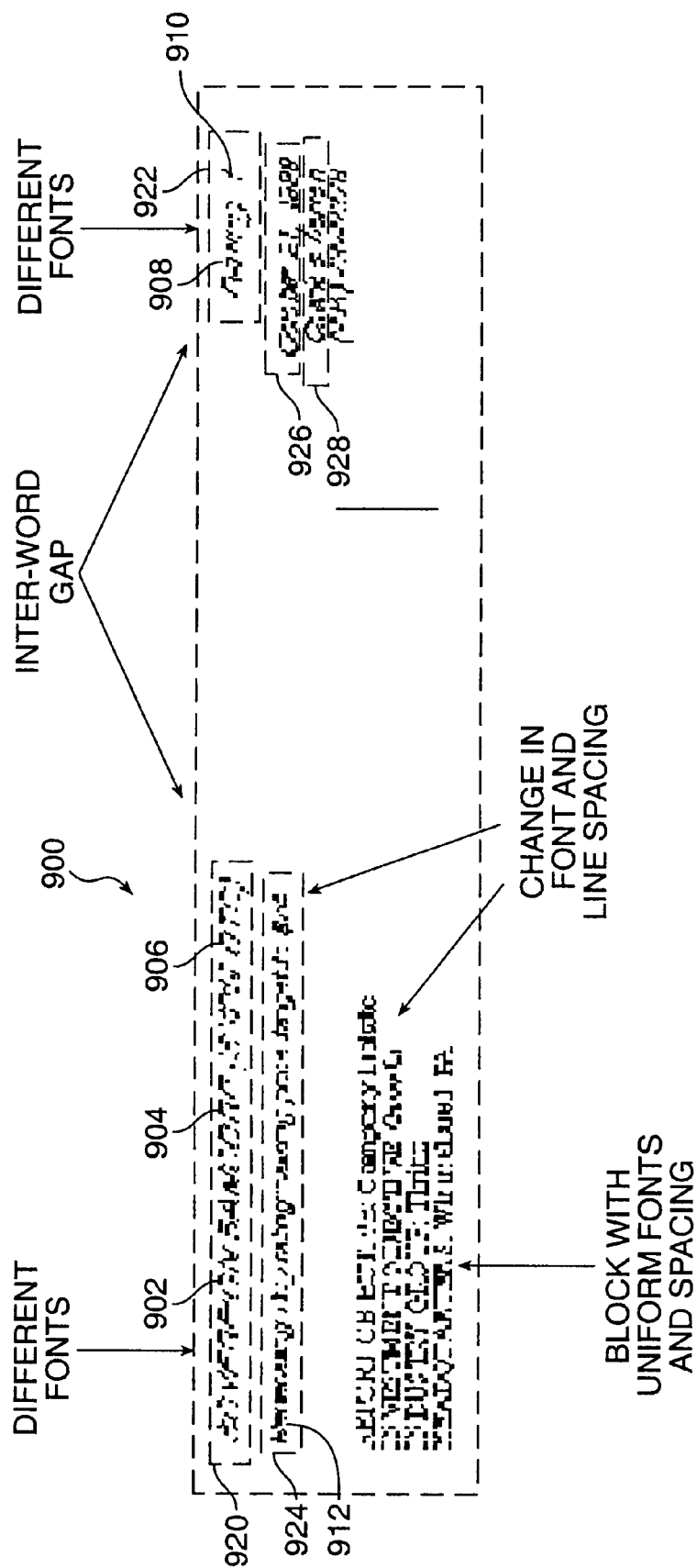
FIG. 9 shows a portion of a sample document illustrating the various criteria used for joining words and lines.

FIG. 9 shows a portion of a sample document 900 illustrating various criteria used for joining words into lines at step 704. For example, a line is started with word 902, a first word in the list of sorted words (e.g., sorted by position in the document). The line is defined as the current line. A next word 904 in the list of sorted words is selected and determined to be in the current line, i.e., within the paragraph threshold distance in the Y direction. Selected word 904 is also within the paragraph threshold distance in the X direction and thus is added to the current line.

A next word 906 in the list of sorted words is then selected and it is determined that word 906 is in the current line, i.e., the upper and/or lower Y coordinate(s) of word 906 is within the threshold distance of the corresponding Y coordinate(s) of word 902, word 904, and/or the current line. It is also determined that word 904 has X coordinate(s) which are within threshold distance(s) from the X coordinate(s) of word 902, word 904 and/or the current line. Thus, word 906 is added to the current line which already includes words 902 and 904.

A next word 908 in the list of sorted words is then selected and determined to be in the current line as the upper and/or lower Y coordinate(s) of word 908 are within the threshold distance(s) of the corresponding Y coordinate(s) of the current line and/or of any words in the current line. However, because it is determined that the distance between word 908 and any word of the current line, i.e., words 902, 904, 906, is not within the inter-word distance threshold along the X direction, word 908 is not added to the current line. After determining that word 908 is not in any other existing line, a new line is started and defined as the current line.

In a similar manner, a next word 910 is selected, determined to be in the current line and within the threshold distance, and added to the current line.

A next word 912 is selected and determined not to be in the current line nor on any other existing line such that word 912 is added to a new line. The new line is defined as the current line. The remainder of the words in document 900 are joined into one or more existing and/or new lines in a manner similar to that described above.

Step 706: Join Lines into Paragraphs

Figure 10:
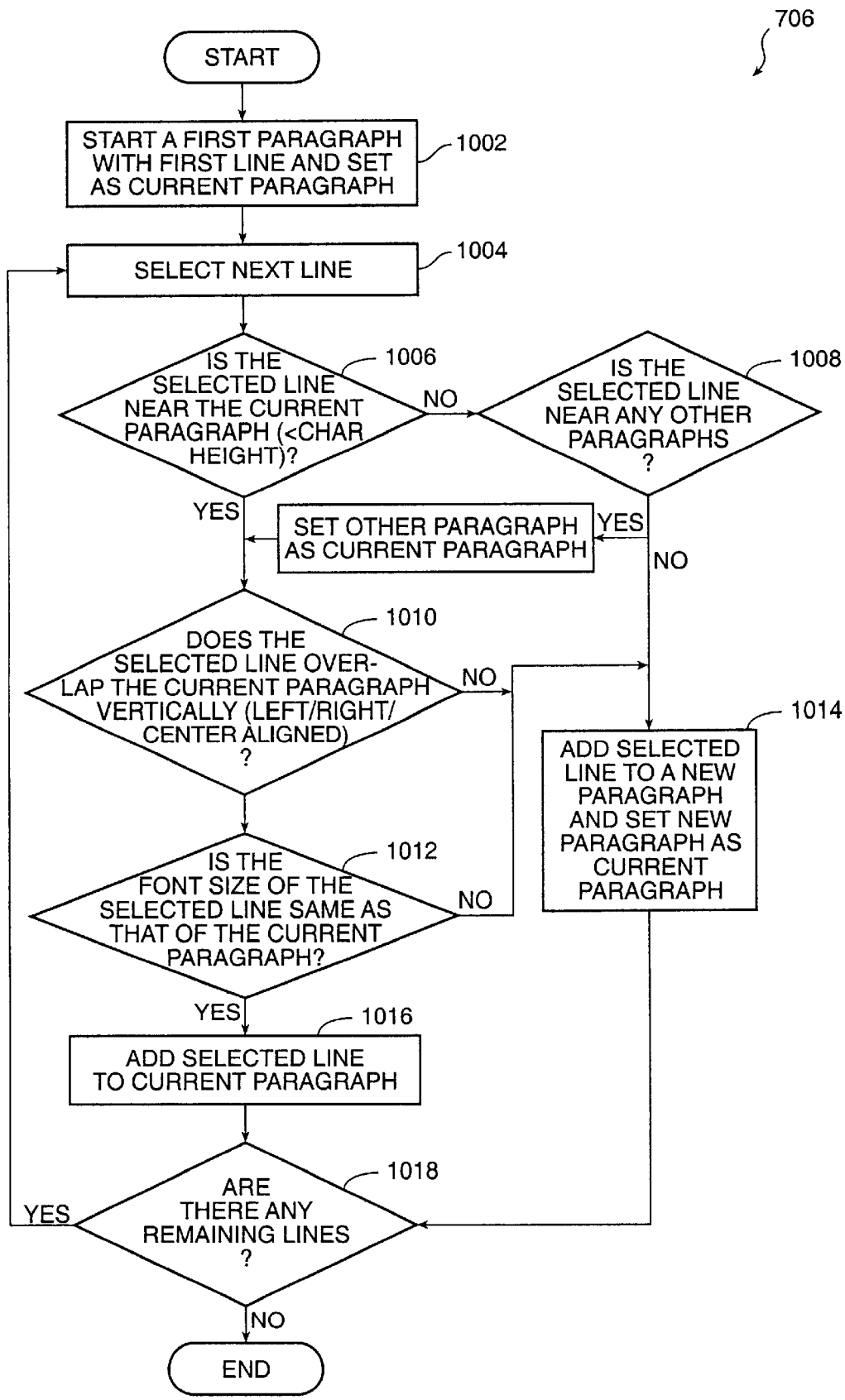
FIG. 10 shows a flow diagram illustrating the processing steps for joining the lines into paragraphs.

FIG. 10 shows a flow diagram illustrating the processing steps for joining the lines into paragraphs after each of the words in the sorted list of words has been assigned to a line.

To join the lines into paragraphs, the first line is assigned to a first paragraph at step 1002. This first paragraph is defined as the current paragraph. A next line is then picked or selected at step 1004.

Preferably, three criteria are met prior to assigning a selected line to a given paragraph. The three criteria are: (1) the selected line is near the paragraph in the Y direction as determined at step 1006; (2) the selected line overlaps the paragraph vertically in the X direction as determined at step 1010; and (3) the words of the selected line have the same font size as the words in the paragraph as determined at step 1012. These criteria and steps 1006, 1010, and 1012 are described in more detail below.

After selecting the next line at step 1004, step 1006 determines whether the selected line is near the current paragraph in the Y direction. To determine whether the selected line is near the current paragraph in the Y direction, the appropriate Y coordinate(s) of the selected line are compared with the appropriate Y coordinate(s) of the previous line of the current paragraph to determine whether certain parameters and/or thresholds are satisfied.

For example, the upper Y coordinate of the selected line may be compared with the lower Y coordinate of the previous line in the current paragraph to determine inter-line spacing in the Y direction. If the inter-line spacing in the Y direction is greater than a threshold, for example, 1.75 times the average character height, then the inter-line spacing threshold in the Y direction is not satisfied and the line is determined not to be near the current paragraph in the Y direction. In addition, if the selected line is at approximately the same position in the Y direction as the previous line in the current paragraph, such as within 10% of the average character height above or below the Y coordinate of the previous line in the current paragraph, the inter-line spacing does not satisfy the minimum inter-line spacing threshold in the Y direction and the line is determined not to be near the current paragraph in the Y direction. Of course, other suitable comparisons and/or analysis may be made by step 1006 to determine whether the selected line is near the current paragraph.

If step 1006 determines that the selected line is not near the current paragraph, step 1008 determines whether the selected line is near any other existing paragraph, i.e., a paragraph which has at least one line assigned thereto. This may be determined with analysis similar to that described above with reference to step 1006.

If step 1006 determines that the selected line is near the current paragraph, or if step 1008 determines that the selected line is near another existing paragraph which is then defined as the current paragraph, step 1010 determines whether the selected line vertically overlaps the current paragraph. A selected line vertically overlaps the current paragraph if the selected line has the same alignment as the current paragraph, for example, left, right or center alignment.

For example, if the left X coordinate of the first word of the current line is within a threshold distance relative to the left X coordinate of the first word of the previous line in the current paragraph, then both the selected line and the current paragraph are left aligned and thus overlap. However, as there may be an indented first line in a paragraph, the threshold distance may be defined to be a larger number when comparing the left X coordinate of the first word of the current line with the left X coordinate of the first word of a first line in the current paragraph to account for the hanging indent.

If the right X coordinate of the last word of the current line is within a threshold distance from the right-most X coordinate of the last words of the lines of the current paragraph, then both the selected line and the current paragraph may be right aligned and thus overlap. Further, if the center X coordinate of the current line, i.e., the average of the left X coordinate of the first word and the right X coordinate of the last word of the current line, is within a threshold distance less or greater than the center X coordinate of the previous existing line in the current paragraph, i.e., the average of the left X coordinate of the first word and the right X coordinate of the last word of the previous existing line of the current paragraph, then both the selected line and the current paragraph may be center aligned and thus overlap. The threshold distance may be, for example, 0.5 of the width of a character of the average width of a character.

The above are merely illustrative examples for determining the alignment of the lines and whether a line near a paragraph is similarly aligned. Other suitable methods may be utilized. For example, the above method may be modified to only evaluate the last existing line of the current paragraph to determine whether the current line is similarly aligned.

If step 1010 determines that the selected line overlaps the current paragraph, step 1012 then determines whether the words of the selected line has the same font size as the words of the current paragraph. As discussed above, the digital data in the input format provides information on the font of each words, including the style, weight to indicate bold or not bold and size.

If step 1008 determines that the selected line is not near any other existing paragraph, if step 1010 determines that the selected line does not overlap with the current paragraph, or if step 1012 determines that the words of the selected line does not have the same font size as the words of the current paragraph, then a new paragraph is started by adding the selected line to a new paragraph and setting the new paragraph as the current paragraph at step 1014.

If step 1012 determines that the font size of the words of the selected line is the same as that of the words of the current paragraph, then the selected line is added to the current paragraph at step 1016. After either step 1014 or step 1016 adds the selected line to a paragraph, step 1018 determines if any lines remain to be assigned to a paragraph. If there are remaining lines to be assigned to a paragraph, the process continues from step 1004 to select a next line. If all lines have been assigned to a paragraph, the process of joining lines into paragraphs is complete.

Illustration of Joining Lines into Paragraphs at Step 706

Referring again to FIG. 9, the portion of sample document 900 also illustrates the various criteria used for joining into lines into paragraphs at step 706.

For example, after a first line 920 is added to a first paragraph and the first paragraph is defined as the current paragraph, the next line 922 is selected. It is then determined that line 922 is not near the current paragraph because the Y coordinate of line 922 is at approximately the same position in the Y direction as the previous line 920 in the current paragraph such that the minimum inter-line spacing in the Y direction is not satisfied. It is also determined that line 922 does not satisfies the inter-line spacing criteria in the Y direction for any other existing paragraphs and thus line 922 is added to a new paragraph which is defined as the current paragraph.

As there are lines unassigned to a paragraph, next line 924 is selected. It is determined that line 924 is not near the current paragraph containing line 922. It is then determined that line 924 is near the paragraph containing line 920 and defines that paragraph as the current paragraph. In addition, it is determined that line 924 overlaps the current paragraph as line 924 and the current paragraph are both left aligned. However, because line 924 does not contain the same font size as the current paragraph and line 924 is not near any existing paragraphs, line 924 is added to a new paragraph, which is then set as the current paragraph.

In a manner similar to that described above, line 926 is determined not to be near the current paragraph containing line 924 but is near the paragraph containing line 922 and defines that paragraph as the current paragraph. It is determined that line 926 overlaps the current paragraph as line 926 and the current paragraph are both right aligned. However, because line 926 does not contain the same font size as the current paragraph, line 926 is assigned to a new paragraph. As there are lines unassigned to a paragraph, the next line 928 is selected as the current line.

Line 928 is determined to be near the current paragraph containing line 926 and overlaps the current paragraph because line 928 and the current paragraph are both right aligned. It is also determined that line 928 contains the same font size as the current paragraph and line 928 is assigned to the current paragraph containing line 926.

The remainder of the lines in document 900 are joined into one or more new and/or existing paragraphs in a manner similar to that described above.

Step 708: Locate Tables

After the words are joined into lines and the lines joined into paragraphs, tables are located at step 708. Any suitable method may be utilized to locate tables from the joined paragraphs. For example, U.S. Pat. No. 5,737,442 issued on Apr. 7, 1998 to H. Alam, discloses a processor based method for recognizing, capturing and storing tabular data from digital computer data representing a document, the disclosure of which is incorporated herein by reference in its entirety.

One method of locating tables from a document in the original input format at step 708 generally comprises evaluating a horizontal projection profile of the document, determining upper and lower boundaries of a table by analyzing white space disclosed by the horizontal projection profiles, evaluating a vertical projection profile of the document, and determining a horizontal location of the table by analyzing white space disclosed by the vertical projection profiles.

Figure 11:
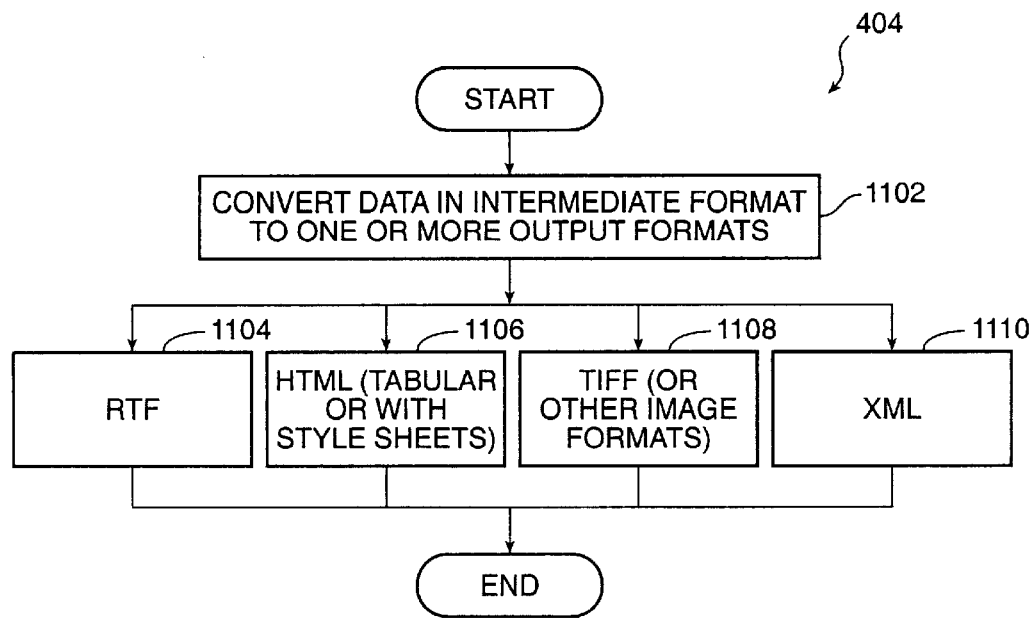
FIG. 11 shows a flow diagram illustrating the process for converting the document stored in an intermediate format to an output format.

FIG. 11 shows a flow diagram illustrating process 404 for converting the data stored in an intermediate format to the desired output format. The intermediate format is converted to one or more of the supported output formats at step 1102. As noted above, the output format may be one or more versions of HTML, XML, CSS, Netscape Layers, linked and separate pages, PDF, TIF (or other image formats such as GIF, BMP, JPEG), RTF, and any other formats, although only exemplary output formats RTF 1104, HTML (tabular or with style sheets) 1106, TIFF (or other image formats) 1108, and XML 1110 are shown. Because HTML Version 3.2, for example, does not allow placement of block at specified coordinates while HTML Version 4.0, for example, allows specification of coordinates for placement of block, conversion process 404 preferably supports both HTML types.

Thus, providing a conversion process to generate HTML with style sheets as well as tabular HTML supports differing versions of HTML. The output may include documents in one or more of possible output formats.

Figure 12:
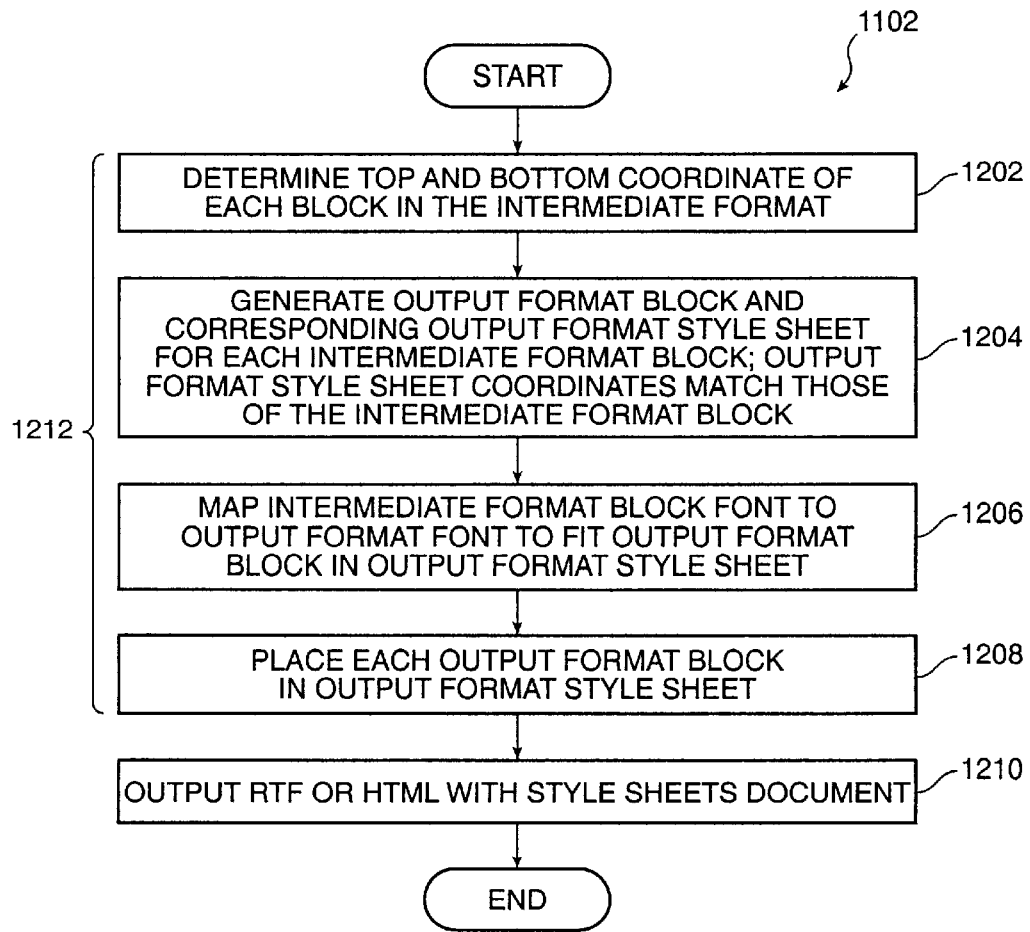
FIG. 12 shows a flow diagram illustrating the conversion from an intermediate format to RTF or HTML with style sheets output format.

FIG. 12 shows a flow diagram illustrating step 1102 of converting from the intermediate format document to RTF or HTML with style sheets output format document 1104 or 1106. To convert to RTF or HTML with style sheets output format, the top left and bottom right X and Y coordinates may be determined for each block in the intermediate format at step 1202. As noted above, the information stored in the intermediate format may include one or more blocks. Each block may be a paragraph, an element in a table, all or a portion of the table, depending upon the spacing of the elements of the table, or an image.

An output format block is generated for each block of the intermediate format at step 1204. Output format blocks are created such that the coordinates of the output format blocks in the output format style sheet correspond to coordinates of the intermediate format blocks. The font of each intermediate format block is mapped to a font in the output format font at step 1206 such that each block in the intermediate format fits in the corresponding output format block. Each output format block with the output format mapped font is then placed in the corresponding output format text block at step 1208.

Blocks in the intermediate format may be processed by process 1212 individually such that process 1212 is executed once for each intermediate format block, in multiple groups such that process 1212 is executed once for each group of intermediate format blocks, or all at once such that process 1212 is executed once for all the intermediate format blocks. After completion of all iterations of process 1212, an output RTF or HTML with style sheets format document is outputted at step 1210.

Figure 13:
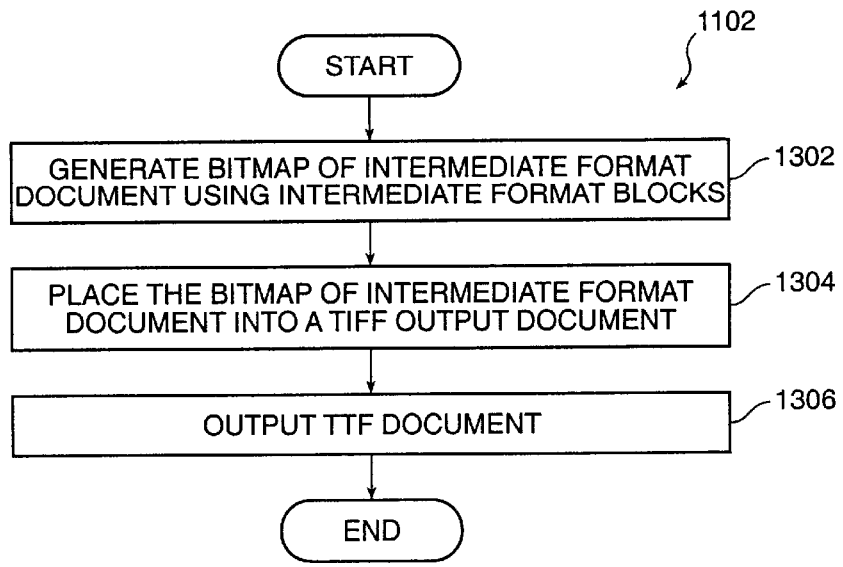
FIG. 13 shows a flow diagram illustrating the conversion from an intermediate format to TIFF output format (or other image formats)

FIG. 13 shows a flow diagram illustrating step 1102 of converting from the intermediate format to the TIFF output format (or other image formats). First, a bitmap of the document is generated using the intermediate format blocks at step 1302. The bitmap of the intermediate format document is placed into a TIFF output document at step 1304. Finally, the TIFF output document is output at step 1308.

Figure 14:
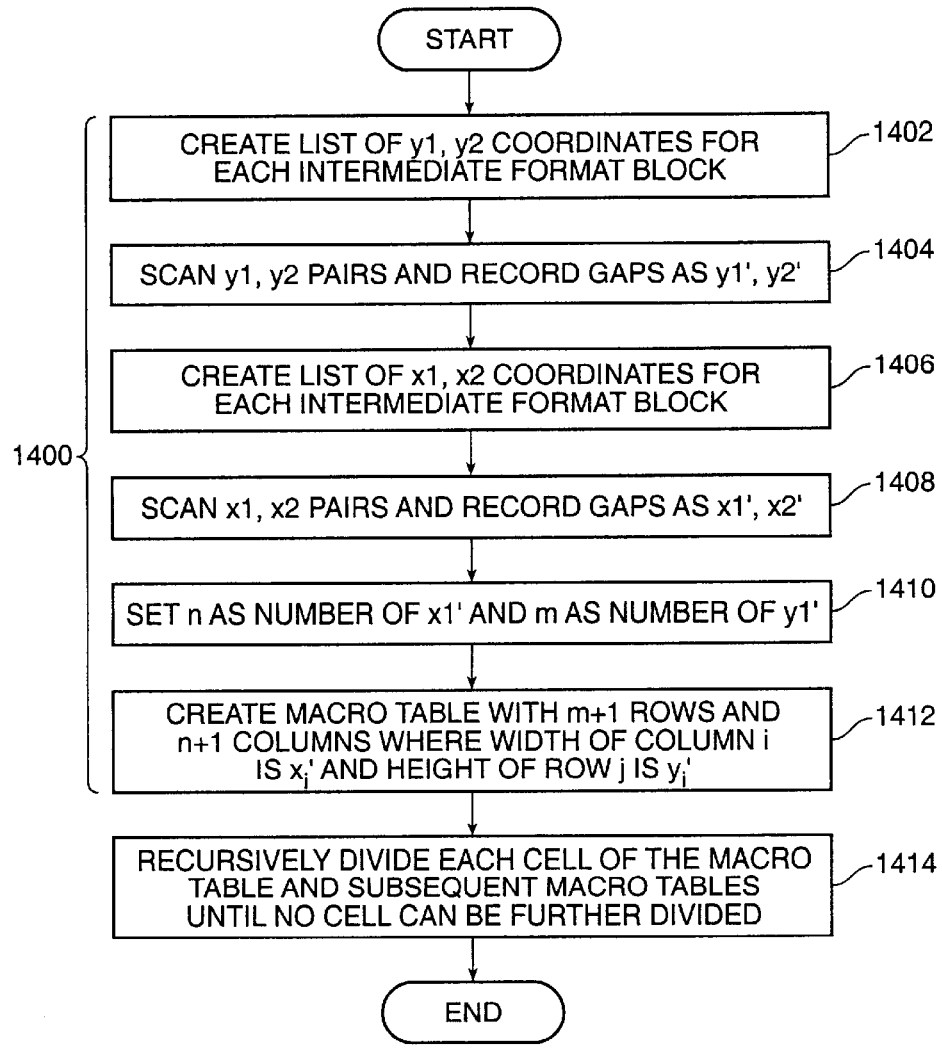
FIG. 14 shows a flow diagram illustrating a first portion of the conversion from an intermediate format to tabular HTML output format.

FIG. 14 shows a flow diagram illustrating a first process of step 1102 of converting from the intermediate format to tabular HTML output format 1108. As noted above, HTML Version 3.2, for example, does not allow placement of block at specified coordinates. Thus, conversion process preferably includes generation of a grid in a tabular HTML output document. The grid may generally be a table having, preferably, a minimal number of cells.

To convert to the tabular HTML output format, a list of upper and lower Y coordinates, y1, y2, of each block is created at step 1402. The list of Y coordinates is scanned to locate gaps or spaces between blocks in the Y direction and the upper and lower Y coordinates, y1', y2', of each gap between blocks is recorded at step 1404. As is evident, the Y coordinates, y1', y2', of each gap generally correspond to the y1 Y-coordinate of one block and y2 Y-coordinate of another blocks. Similarly, a list of left and right X coordinates, x1, x2, of each block is created at step 1406. The list of X coordinates is scanned to locate gaps or spaces between blocks in the X direction and the upper and lower X-coordinates, x1', x2', of each gap between blocks is recorded at step 1408. As is evident, the X coordinates, x1', x2', of each gap generally correspond to the x1 X-coordinate of one block and the x2 X-coordinate of another block.

Next, "m" is assigned to be the number of y1', i.e., the number of gaps in the Y direction, and "n" is assigned to be the number of x1', i.e., the number of gaps in the X direction, at step 1410. A macro table with m+1 number of rows and n+1 number of columns is then created at step 1412.

The border between row j and row j+1, where j ranges from 1 to m, is positioned at $y1_j'$ Y coordinate. Thus, the height of each row is the distance between two borders along the Y direction. For a row which extends to an edge of the page in the Y direction, the height of such a row is the distance from the edge of the document, i.e., the minimum or maximum X coordinate of the table being divided, to the row border. If there is only one row, the height is simply equal to the maximum X coordinate of the table being divided. In addition, the border between column i and column i+1, where i ranges from 1 to n, is positioned at $x1_j'$ X coordinate. Thus, the width of each column is the distance between two borders along the X direction. For a column which extends to an edge of the page in the X direction, the width of such a column is the distance from the edge of the document, i.e., the minimum or maximum Y coordinate of the table being divided, to the column border. If there is only one column, the width is simply equal to the maximum Y coordinate of the table being divided.

At step 1414, each cell of the macro table is recursively subdivided using above-described process 1400. In the first iteration of process 1400, "macro table" refers to the table encompassing the entire page or document. In each subsequent iteration of process 1400, "macro table" refers to a table encompassing only a cell of a higher-level macro table being sub-divided. In either case, the maximum and minimum X and Y coordinates for all subsequent iterations of process 1400 are those of the cell of the higher-level macro table being sub-divided. Process 1400 is repeated until each cell of the initial and all subsequent macro tables can no longer be divided. Each cell of the macro table may include one or more intermediate format blocks.

Figure 15A:
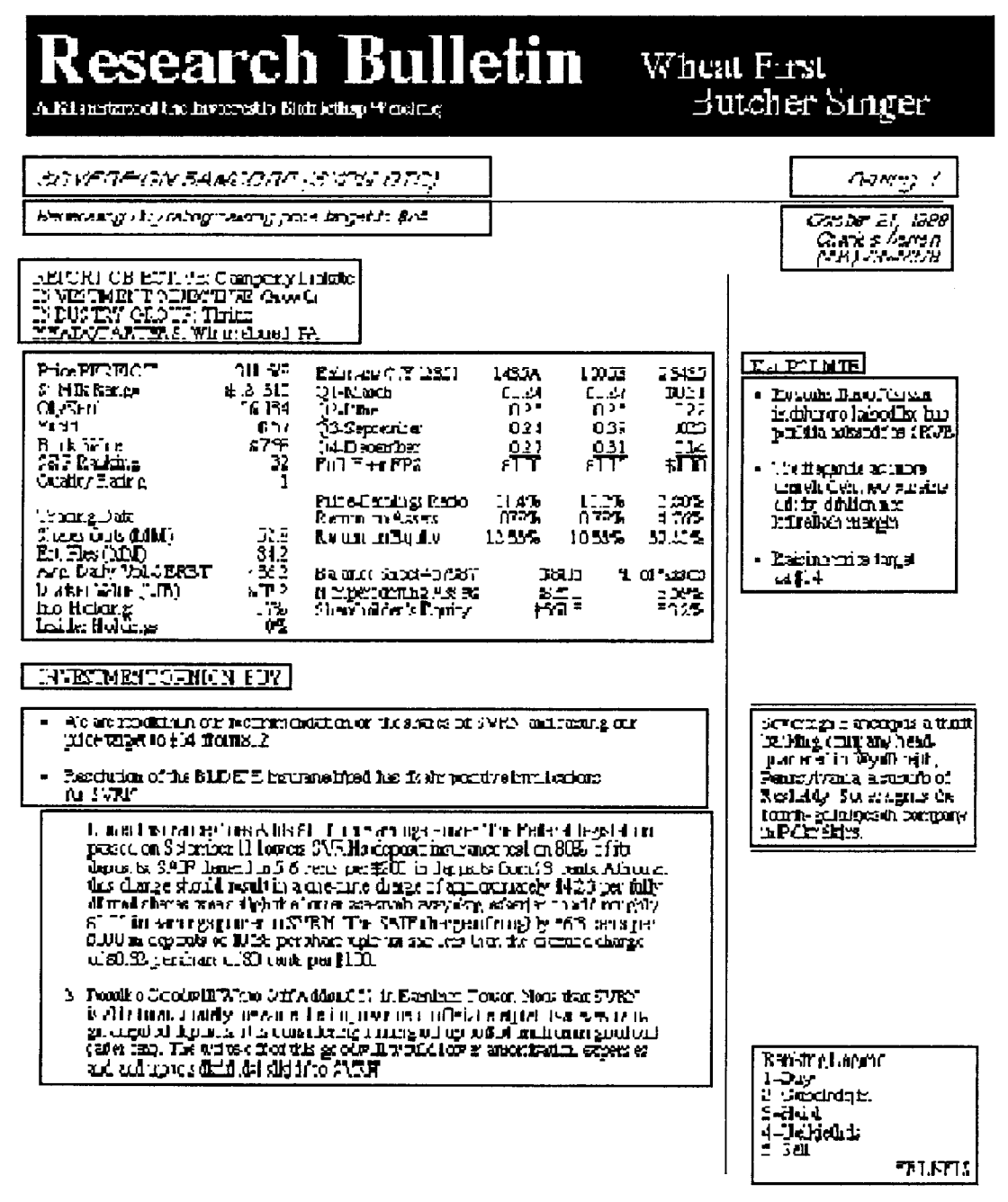
Figure 15B:
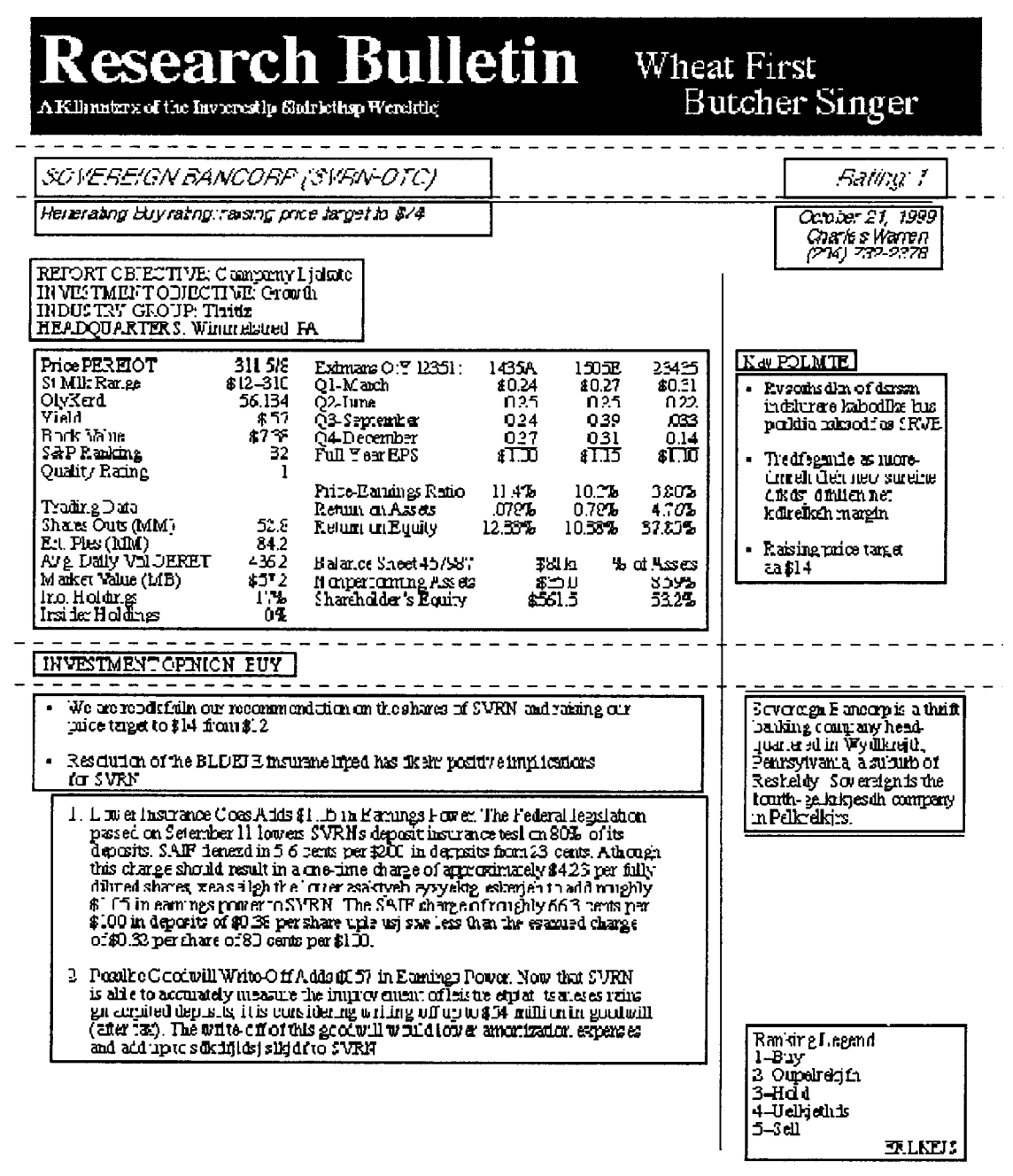

FIG. 15A shows a page of a sample document and FIG. 15B illustrates approximate division of the sample document page of FIG. 15A into cells of a macro table. As shown in FIG. 15B by dashed lines, the macro table is divided into cells in five rows and single column in the first iteration. Further, each block is designated with a border around the block. The horizontal span of the cell of the first or top row prevents this first macro table from being further divided. After all iterations of subdividing the highest-level macro table, each block occupies a single cell of the HTML table. FIG. 15C shows an example of a subsequent iteration of dividing a macro table. Specifically, the cell of the last row of the first macro table is itself a lower-level macro table which can be divided into two columns. Although not shown, further subdivisions of other cells of the first or highest-level and subsequent or lower-level macro tables is possible.

Figure 16:
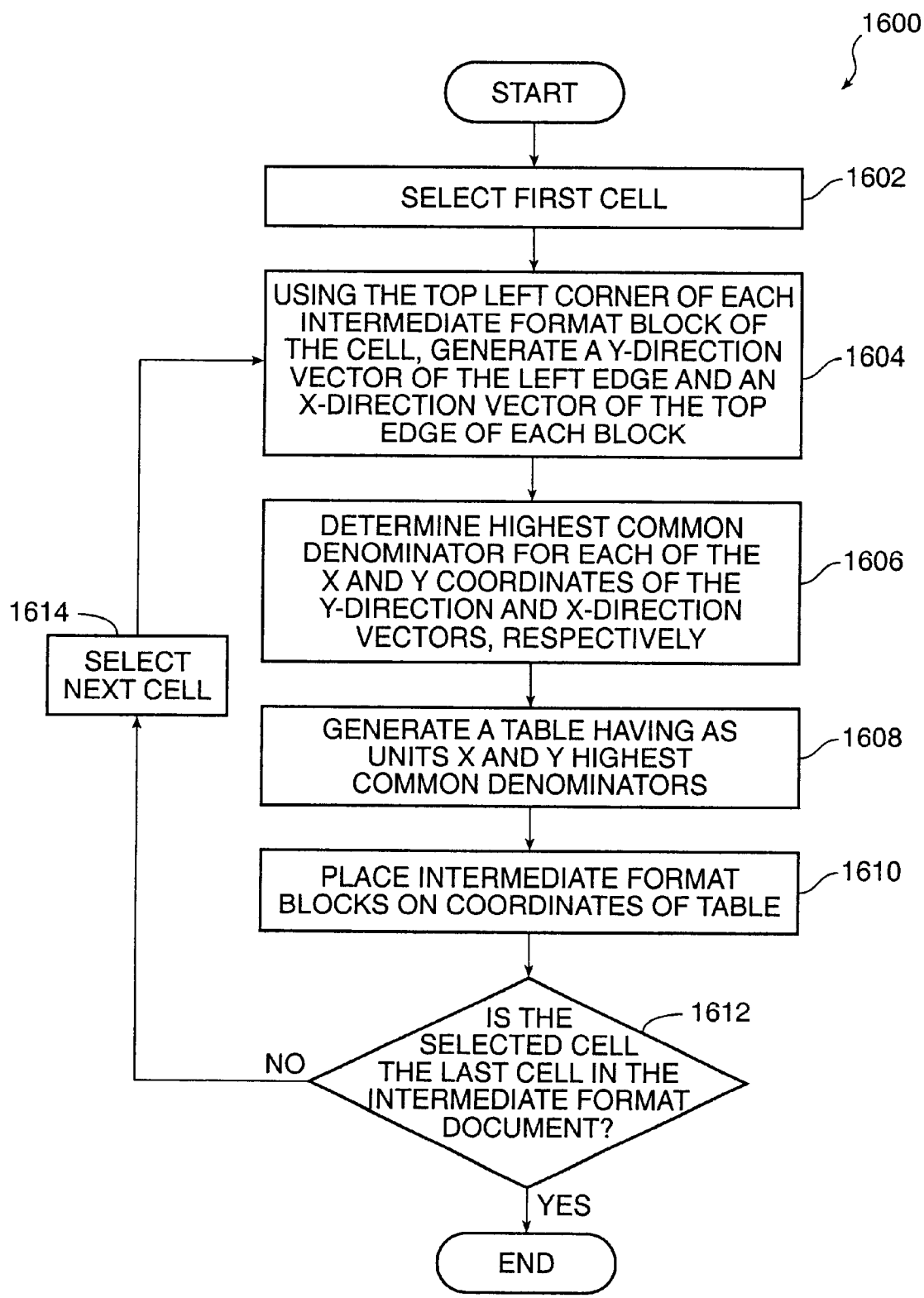
FIG. 16 shows a flow diagram illustrating a second portion of the conversion from an intermediate format to the tabular HTML output format.
Figure 18:
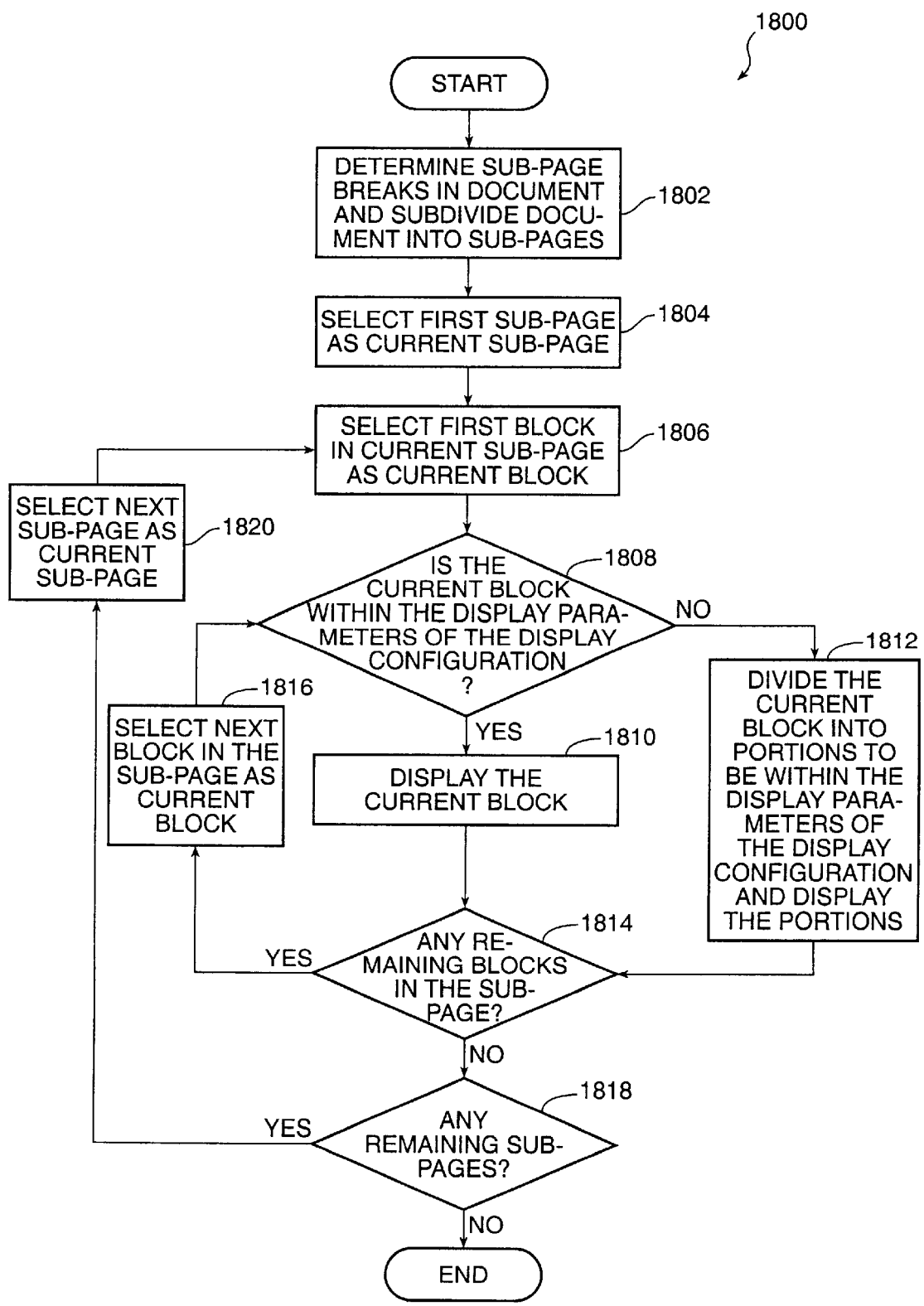
FIG. 18 shows a flow diagram of a process for reformatting a document into display pages for display on a differently configured display.

FIG. 16 shows a flow diagram illustrating a second process 1600 of step 1102 to convert an intermediate format document to a tabular HTML output document. Process 1600 attempts to partition each non-divisible cell generated by the first process 1400 and places each intermediate format block at the corresponding coordinate in the output tabular HTML document.

Specifically, a first cell of all the macro tables is selected at step 1602. The first cell may be the cell having the smallest upper left X coordinate and/or the smallest upper left Y coordinate. Each cell may include one or more intermediate format blocks. Starting at the top left corner of the selected cell, a vector of the X coordinate of the left edge and a vector of the Y coordinate of the top edge of each block in the cell is generated at step 1604. Each Y direction vector has an X coordinate corresponding to the left edge of the corresponding block and each X direction vector has a Y coordinate corresponding to the top edge of the corresponding block. The highest common factor for each of the X and Y coordinates of the Y-direction and X-direction vectors, respectively, is determined at step 1606.

A table of X and Y coordinates is generated at step 1608 where the X and Y coordinates are multiples of the highest common factor for the X and Y coordinates, respectively. The intermediate format blocks within each cell are then positioned at the corresponding coordinates of the HTML table at step 1610. Step 1612 determines if the selected cell is the last cell of the intermediate format document or if there is any cell that has not been selected. If the selected cell is not the last cell of the intermediate format document or if there are unselected cells, then step 1614 selects the next cell and continues from step 1604. If the selected cell is the last cell or the last selected cell of the intermediate format document, then the HTML table containing the blocks therein is outputted as an output tabular HTML document at step 1616.

As an example to illustrate the determination of highest common factor at steps 1606 and the generation of a table within the cell at step 1608, if the X coordinates of the left edges of the blocks in the cell are 3, 12, 30 and 45, the highest common factor would be 3. Thus, the table of X coordinates generated by step 1608 would be 3, 6, 9, 12, 15, 18, 21, 24, 247, 30, 33, 36, 39, 42 and 45, i.e., multiples of the 3, the highest common factor.

FIG. 17 shows a portion of a sample document illustrating the partitioning of a non-divisible cell of a table into a table of X and Y coordinates, although only the positions of the partitioning X coordinates are shown for purposes of clarity. In the sample document portion shown, each line of text containing more than one block may become a macro table which is further divided such that each block is an element of the macro table. The line segments shown indicate multiples of the highest common factor of the X coordinates of the blocks of each macro table.

Reformatting for Display on Differently Configured Displays

The above-described conversion process may be utilized to convert data representing a document to a format suitable for display in a display having configuration different from those for which the input format is suitable. For example, a document may be in a format suitable for display on a typical desktop or laptop monitor and it may be desirable to convert the document to another format suitable for display on, for example, internet connected televisions and/or portable devices such as cellular or wireless telephones, PDAs, pagers, and/or voice products. The different configuration requirements may be attributable to different display sizes and/or resolutions, for example.

FIGS. 18–28 illustrate the process for and examples of such reformatting for different display configurations. Reformatting process 1800 may include determining sub-page breaks in a document and subdividing the document into sub-pages at step 1802. A sub-page break may be a divider line either horizontally or vertically across a page, for example. The first sub-page is then selected as the current sub-page at step 1804 and the first block in the current sub-page is selected as the current block at step 1806. If it is determined that the current block is within the display parameter of the display configuration at step 1808, then the current block is displayed at step 1810. If the current block is determined not to be within the display parameter of the display configuration at step 1808, then the current block is divided into portions such that each portion is within the display parameter of the display configuration and the portions are displayed at step 1812.

After step 1810 or step 1812, if step 1814 determines that there are remaining blocks in the sub-page, then the next block in the sub-page is selected as the current block at step 1816 and the process continues from step 1808. However, if step 1814 determines that there are no remaining blocks to be displayed in the current sub-page, then step 1818 determines if there are any remaining sub-pages in the document. If there are remaining sub-pages in the document, the next sub-page is selected as the current sub-page at step 1820 and the process continues from step 1806. If there are no remaining sub-pages in the document, reformatting process 1800 is complete.

In one embodiment, after displaying a block such as at step 1810 or after displaying the last portion of a block such as at step 1812, process 1800 may determine if the block is a paragraph that ends with an incomplete sentence or an improper termination.

The determination of whether a block is a paragraph may be achieved by determining whether the block contains one or more sentences. A sentence may be defined as having an initial capitalization followed by a sentence termination punctuation such as a period, exclamation mark, or a question mark which represents the termination of the sentence. It may be determined that the block is not a paragraph, such as in cases where the block is a bullet point or an item in a listing of multiple items. If the block is determined to be a paragraph terminating with an incomplete sentence or an improper termination, then it is determined if the next block begins with an improper sentence or paragraph beginning.

If the block is not a paragraph that ends with an incomplete sentence or an improper termination, process 1800 may continue to step 1814 as described above. If the next block is a paragraph that ends with an incomplete sentence or an improper termination, then the process may determine if the next block begins with an improper sentence or paragraph beginning. An improper sentence or paragraph beginning may contain an initial incomplete sentence without an initial capitalization but containing other initial capitalization(s) and sentence terminations. Alternatively or additionally, an improper sentence or paragraph beginning may contain a non-indented first line while the first line of previous paragraph(s) is indented, for example.

If the next block is not a paragraph or is not a paragraph that ends with an incomplete sentence or an improper termination, then the process examines a predetermined number of subsequent blocks or original document pages or blocks in a predetermined area of the document, for example, to locate the first subsequent block containing a paragraph. If no paragraph is located or if the located paragraph does not begin with an improper paragraph beginning, then the process may continue to execute step 1814 as described above. If a paragraph with an improper paragraph beginning is located, then that paragraph block may be displayed immediately prior to displaying any intervening blocks. The process then continues from step 1814 as described above with only the remaining undisplayed blocks.

In another embodiment, matching of two incomplete paragraphs may be achieved by examining blocks located to the right of the initial incomplete paragraph, rather than simply searching for the second complementary incomplete paragraph from sequentially subsequent blocks. In this embodiment, multiple matches may be found and preferably paragraphs that are close in Euclidean distances are matched.

A syntactic analysis may be executed alternatively or additionally to the above-described incomplete paragraph location process. Parsing rules may be used to determine if the combination of the last and the first incomplete sentences of two paragraph blocks parse correctly according to English grammar rules.

Figure 19A:
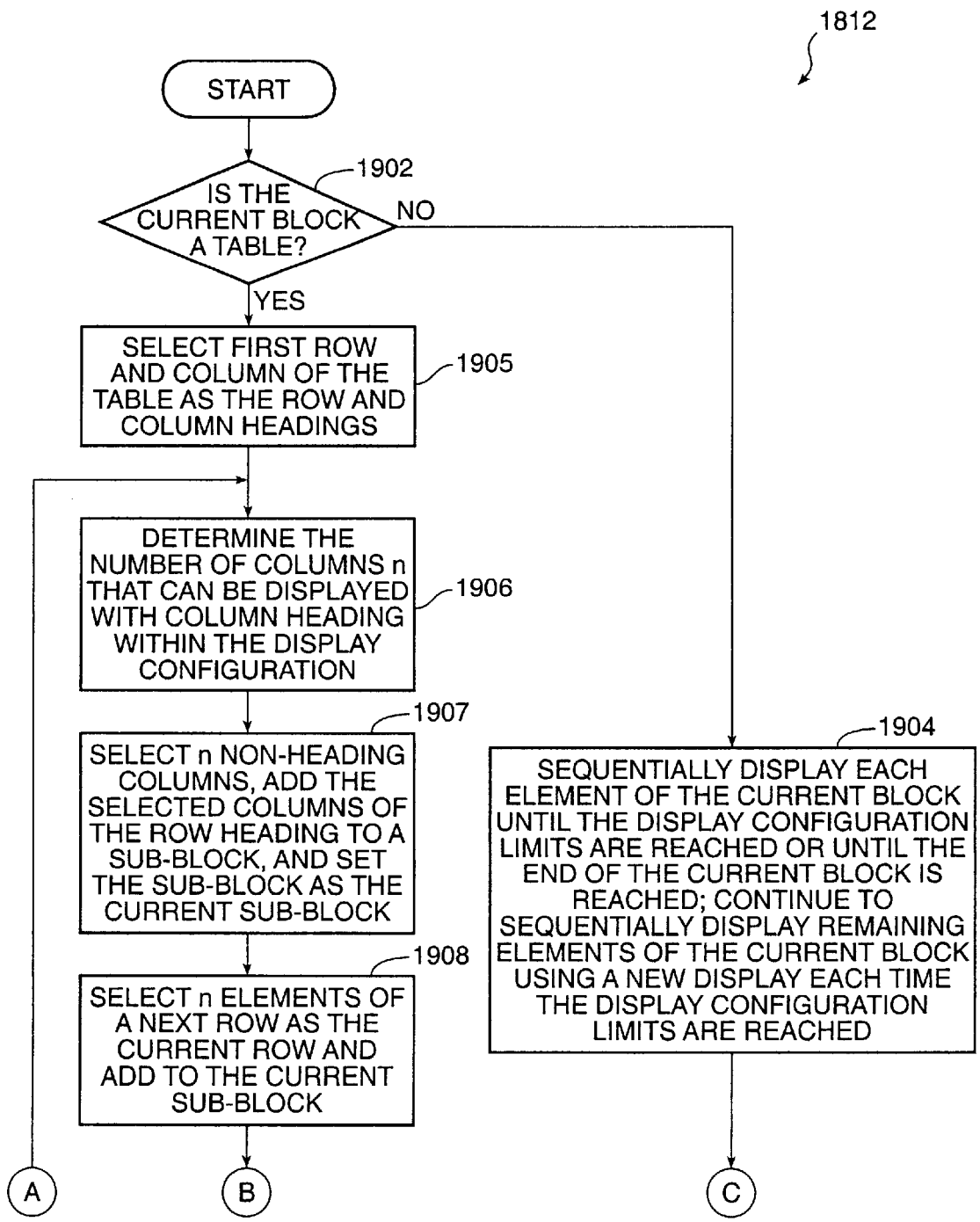
FIG. 19 shows a flow diagram illustrating dividing a current block into portions such that each portion is within the display parameter of the display configuration and for displaying the portions of the current block.
Figure 19B:
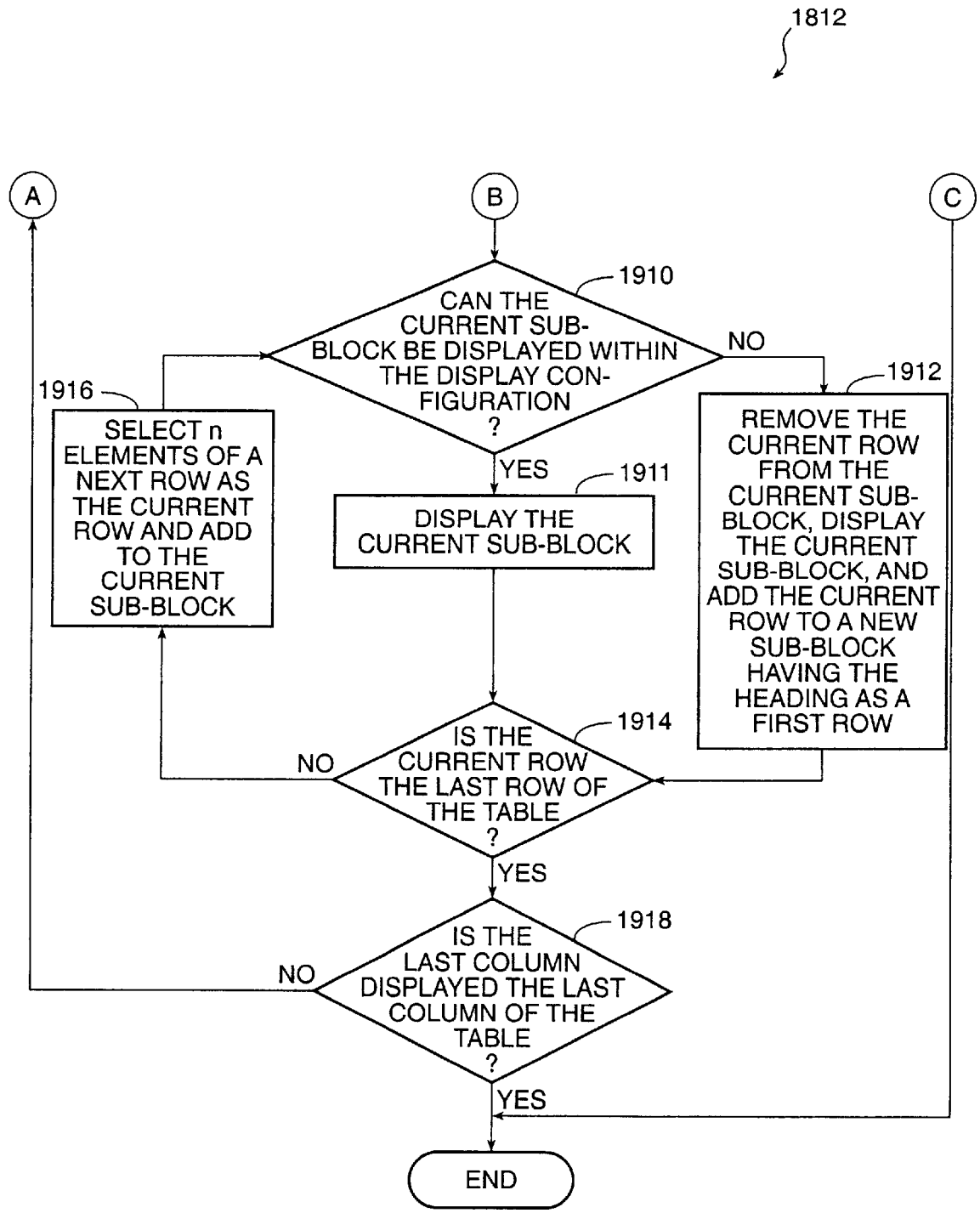

FIG. 19 shows a flow diagram of step 1812 for dividing the current block into portions for display such that each portion is within the display parameter or configuration of the display configuration of the output application or device. First, step 1902 determines if the current block is a table. If the current block is not a table, step 1904 breaks up the current block into elements such that each element can be displayed within the display configuration. Each element of a paragraph block may be, for example, a word contained in the paragraph. Other division of a block into elements may be implemented. For example, each element of a list block may be an item or a line in the list.

Step 1904 also sequentially displays each element until the display configuration limits are reached or all the elements of the current block are displayed. Step 1904 continues to sequentially display the remaining elements of the current block using a new display each time the display configuration limits are reached. Each element of the current block may comprise a word or a line, for example, which can be broken up into multiple lines and/or multiple words.

If the current block is a table, the first row and first column of the table are selected as the row and column headings at step 1905. Although not all first rows and first columns of tables are headings, it can be assumed that the first row and first column are headings. A method may be implemented by which to discriminate between a heading row or column and a data row or column. In addition, some input formats may identify headings of tables and that data can be utilized in this process.

Step 1906 determines the number of columns n that can be displayed with the column heading, if any, within the display configuration. The n non-heading columns are then selected and the selected elements or columns of the first row are added to a subblock set as the current sub-block at step 1907. The n elements of the next row are selected as the current row and added to the current sub-block at step 1908. Step 1910 then determines if the current sub-block can be displayed within the display configuration. If the current sub-block can be displayed within the display configuration, then step 1911 displays the current sub-block. If the current sub-block cannot be displayed within the display configuration, then step 1912 removes the current row from the current sub-block, displays the current sub-block, and adds the current row to a new sub-block having the heading as its first row. The new sub-block is also set as the current sub-block.

After step 1911 or step 1912, step 1914 determines whether the current row is the last row of the table. If the current row is not the last row of the table, n elements of the next row is selected as the current row and added to the current sub-block at step 1916 and the process is continued from step 1910. If the current row is the last row of the table, then step 1918 determines if the last column displayed is the last column of the table. If the last column displayed is not the last column of the table, then the process continues from step 1906. If the last column displayed is the last column of the table, then the process is complete.

In certain circumstances, it may be necessary or desirable to recombine certain cells of a table because the table may have been excessively divided. For example, if a row spans two or more lines, the single row may have been subdivided into multiple rows. The recombining of cells may be especially desirable where process 1812 assigns portions of the table as heading such that the correct heading is displayed in each display page that displays portions of the table.

In one embodiment, improper or erroneous cell breaks between the rows may be determined by locating the upper and lower Y coordinates of each of the rows and determining which of the cell or row breaks may be improper based on the inter-row gaps. For example, the interline spacing within a row may be less than the spacing between two rows. A similar approach may be used to determine improper or erroneous cell breaks between columns.

Additionally or alternatively, based on the nominal cell breaks, improper or erroneous cell breaks between the columns and/or rows may be determined by locating blank cells and recombining the cells in order to eliminate such blank cells in an optimal manner. For example, in a row where only one cell spans across two lines and the each remaining cell only spans one line, the row may be improperly divided into two rows, resulting in all but one blank cell in the lower or second row. The optimal elimination of the blank cells in the lower or second row may be to recombine the mostly blank row with the previous row. Again, a similar approach may be used to determine and remove improper or erroneous cell breaks between the columns.

Certain rules may be set and applied to determine and remove excessive division of table cells. For example, a heading row or column may be all capitalized, larger font, bold, italics, and/or center aligned while the remainder of the cells do not have some or all of these characteristics. Thus, if the first two rows or columns are all capitalized, larger font, bold, italics, and/or center aligned while the remainder of the cells do not have some or all of these characteristics, it may be determined that the first two rows and/or columns should be recombined into one row or column. As is evident, numerous other methodologies may be utilized to determine the optimal table cell division.

In another embodiment, cell breaks may be additionally or alternatively analyzed using semantic analysis to determine correct heading. However, the semantic analysis may require a large amount of context knowledge because often an incomplete sentence with only noun or verb phrases are used as headings.

The above-described cell recombining process may be performed at various points of process 1812. For example, the recombining process may be performed when selecting the first row and column as the headings at step 1905, when determining the number of columns that can be displayed at step 1906, when selecting non-heading columns at step 1907, and when selecting element of a next row at step 1908 or step 1916.

Further, a table may contain one or more sub-tables. In a sub-table, a portion of a column and/or a row may be divided into sub-columns and/or sub-rows. Such sub-tables may lead to multiple row and/or column headings being displayed in display pages. The above-described table detection algorithm may be utilized to recursively search through table cells to determine these sub-tables.

Figure 20:
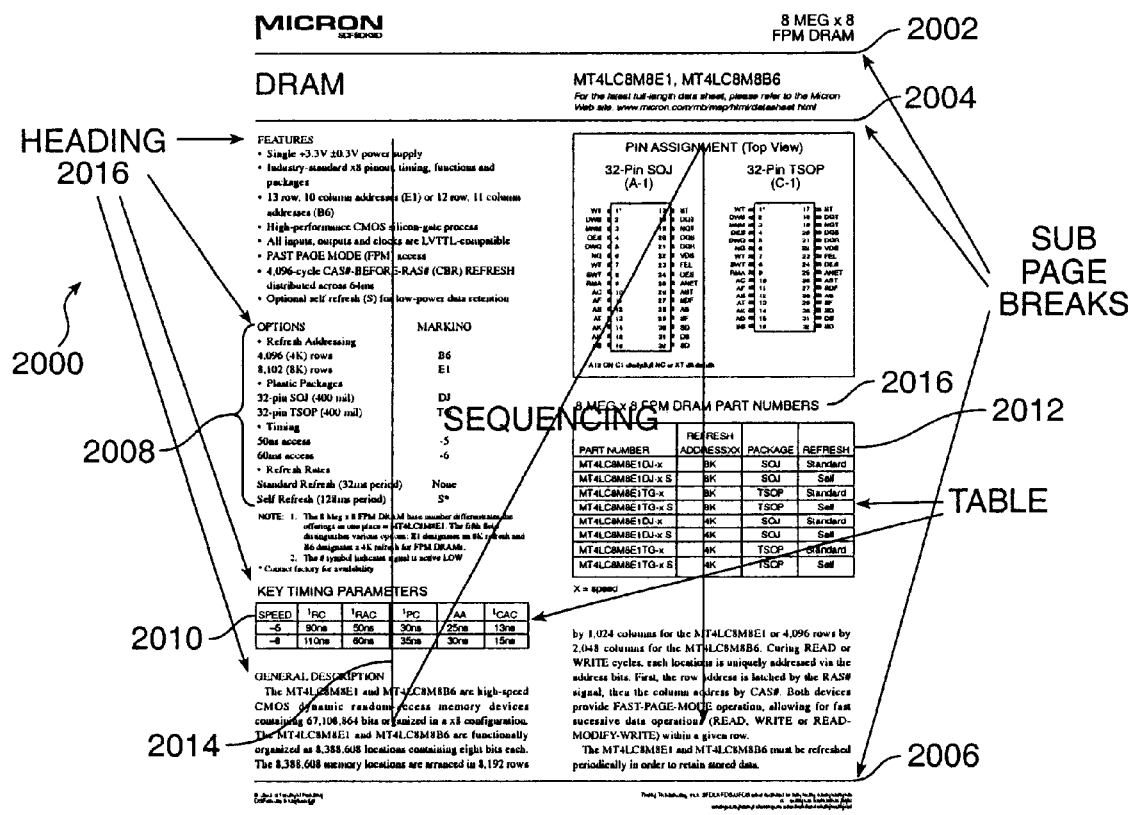
FIG. 20 shows a sample document having sub-page breaks and tables.

FIG. 20 shows a sample document 2000. Sample document 2000 may be divided into four sub-pages by three sub-page breaks 2002, 2004, 2006. Sub-page breaks may be determined by a block containing non-text or image extending across a threshold portion of the width of the page or document. For example, a sub-page break may be a line, as shown in FIG. 20, an image or picture, or series of dashes or other repeating character, extending across, for example, at least 70% of the width of the page or width of the page within margins, if any.

Sample document 2000 contains tables 2008, 2010, 2012. The sequence for displaying the elements of the sub-page between sub-page breaks 2004, 2006 is also shown in FIG. 20 by arrow 2014 wherein the blocks of the sub-page are sequenced from top to down, from left to right.

The sub-page between sub-page breaks 2004, 2006 of document 2000 includes headings 2016. Headings 2016 are preferably identified either in the process of converting an input format document to an intermediate format document, or during reformatting process 1800. The headings may be used to automatically generate a list or table of contents. Generation of a table of contents may be an option selected by a user or set as default. Preferably, the table of contents may be inserted as a first display page in reformatting process 1800. Each heading displayed in the first display page preferably includes a link to the display containing the heading and its associated content.

Alternatively, particularly if reformatting process 1800 is performed on-the-fly, the link of the heading displayed in the table of contents displayed page is to the heading within the output format document and not to a specific display page. When a user selects the link of the heading displayed in the table of contents displayed page, the reformatting process 1800 ignores all contents occurring prior to the selected heading such that the user is presented with a display page having the selected heading as the first content displayed. In other words, breaks between display pages may differ depending upon the link or heading selected by the user.

In this embodiment, reformatting process 1800 preferably can generate display pages in reverse order. For example, after a user selects a heading in the table of contents and views a display page displaying the selected heading as the first content, the user may select a previous page. Then reformatting process 1800 preferably determines, in reverse sequence, blocks and/or portions of blocks that can be displayed within the display parameters of the display configuration.

FIGS. 21A–F show the five display pages into which sample document 2000 may be divided in order to fit as many elements or sub-blocks of the sub-pages onto each display page. Note that each of tables 2008, 2010, 2012, 2014 is displayed on a single display page and is not displayed across multiple display pages as these tables are within the display configuration requirements of the output display device.

FIG. 22 shows a sample table 2200 which may be contained within a document. FIGS. 23A and 23B show sample display pages by which table 2200 may be displayed. As shown, at least a portion of the first row forming the row heading of sample table 2200 is displayed in each of the display pages. Further, at least a portion of the first column forming the column heading of sample table 2200 is displayed in each of the display pages. In the display page shown in FIG. 23A, the first two columns of all rows of the table in addition to the column heading is displayed. In the display page shown in FIG. 23B, all rows of the remaining three columns subsequent to the last column displayed in FIG. 23A are displayed, in addition to the column heading. Although not shown in this example, the rows of sample table 2000 may also be divided to be displayed across multiple display pages.

Figure 24:
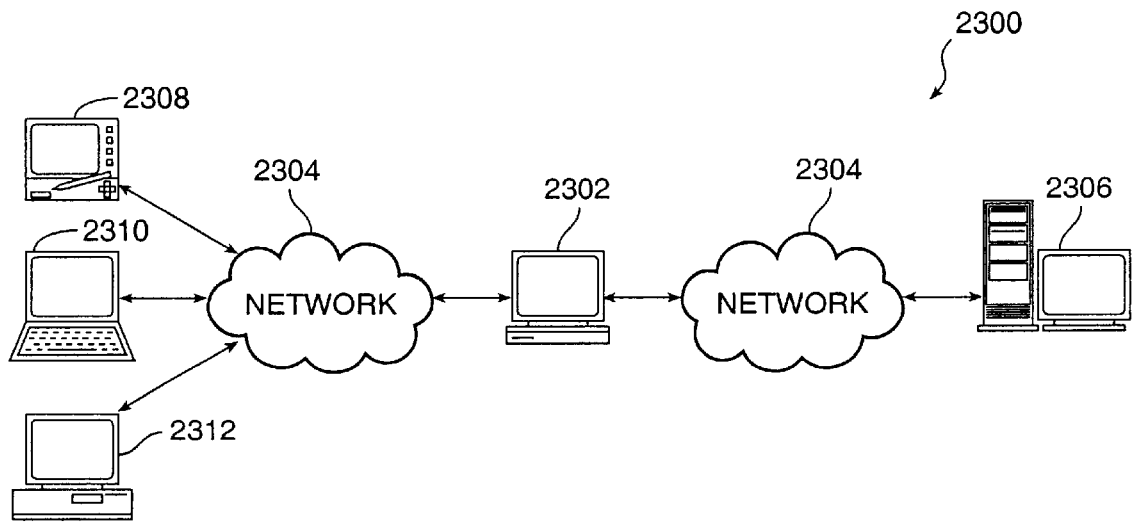
FIG. 24 shows a schematic of a system over which service for converting data representing a document may be provided over a network.
Figure 25:
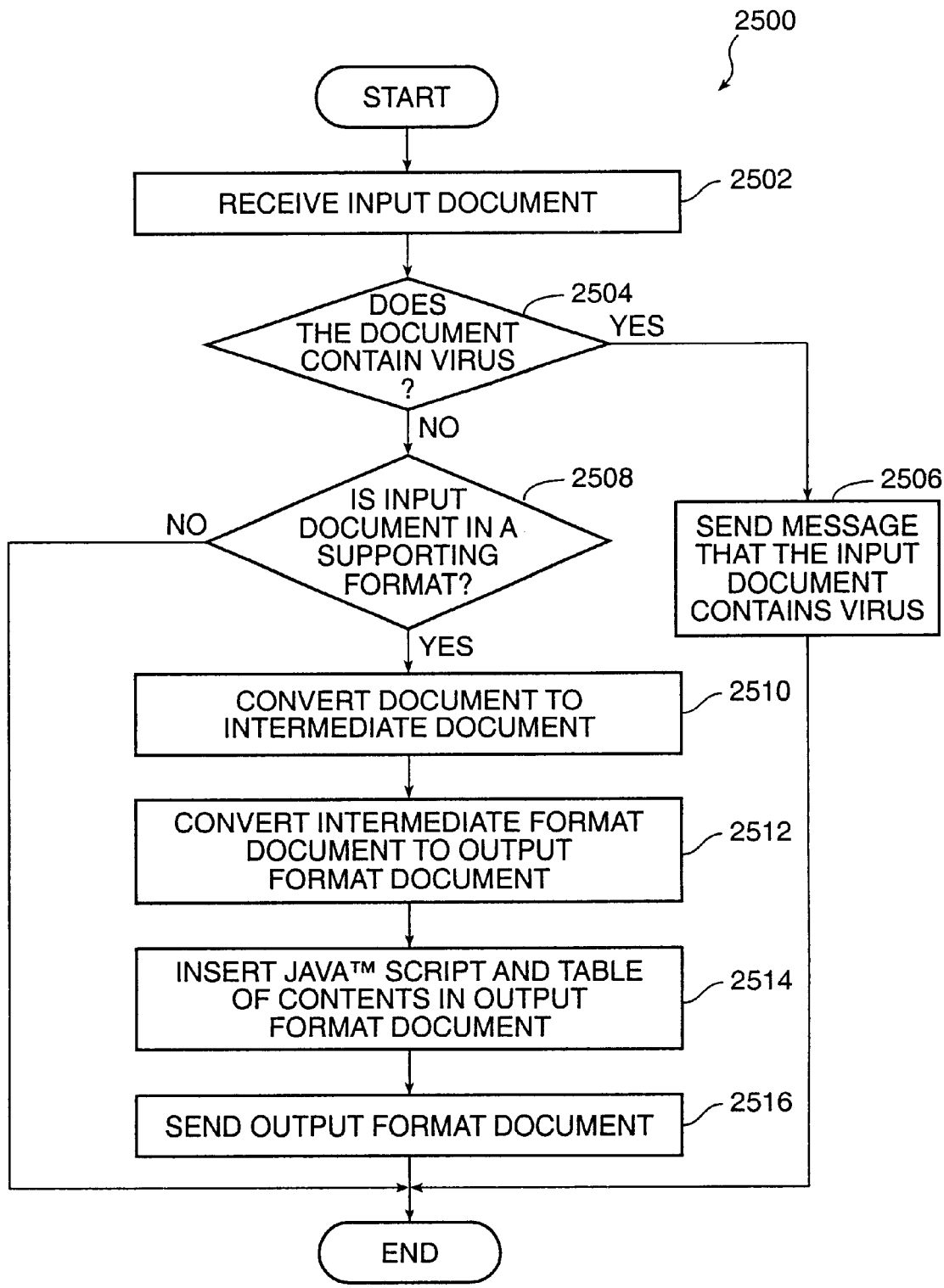
FIG. 25 shows a flow diagram illustrating a service for converting data representing a document over a network.

FIG. 24 shows a schematic of a system 2300 over which service for converting data representing a document into an output format document may be provided over a network 2304. FIG. 25 shows a flow diagram of the service for converting data representing a document over the network.

The service for converting data representing a document may be provided by a computer system 2302 over a network 2304, such as the Internet or an intranet. Network 2304 may be connected to a server 2306 which provides documents, such as webpages, in an input format. Network 2304 may also be connected to output devices such as PDAs 2308, laptop computers 2310, and desktop PCs 2312. Although not shown, many other devices such as a cellular telephones and pagers may also be connected to network 2304.

When computer system 2302 receives a request from an output device such as PDA 2308 to display a document supplied by server 2306, computer system 2302 may execute process 2500 for converting an input format document to an output format document. Specifically, process 2500 includes receiving an input document over the network at step 2502. A virus detection program is preferably executed to detect for the presence of viruses in the input document at step 2504. If a virus is detected, step 2506 sends a message over the network to the user or the requesting device that the input document contains viruses. Alternatively, if the document containing a virus can be repaired, the document may be repaired and the process continues to step 2508.

If no virus is detected or if a virus is detected and removed, step 2508 determines if the input document is in a supported format. If the input document is not in a supported format, process 2500 ends. If the input document is in a supported format, the input document is converted to an intermediate format document at step 2510. The intermediate format document is in turn converted to an output format document at step 2512. This conversion process may be as described above, including reformatting as necessary or as requested such that a single page of the input document may be separated into multiple display pages.

A table of contents may be generated using headings as described above and inserted in the output format document at step 2514. In addition, particularly if more than one output format is generated at step 2512, an executable program, such as a JAVA™ script, may be inserted into the output format document at step 2514. Although described in terms of a JAVA™ script, other programming languages such as Common Gateway Interface (CGI), Visual Basic, Practical extraction and reporting language (Perl), C, and C++ may, of course, be utilized. Preferably the JAVA™ script is inserted to the beginning of the output format document. The JAVA™ script may be executed by the display device such as the PDA to select a suitable output format from the plurality of output formats generated for display. The suitable output format may depend upon, for example, the display device and/or the browser used by the display device. The output format document is then sent or delivered over the network to the user or the requesting device at step 2516. Where more than one output format is generated, an output document may be generated for each output format or a single output document may be generated for all output formats. In either case, the JAVA™ script is preferably inserted into each output document.

The user may provide the input document or the location or address of the input document, such as an Internet web address, for example. The specific output format may also be specified by the user or may be determined depending upon the requesting application or output display device. The request and other information from the user may be delivered to computer system 2302 via electronic mail, Internet or intranet, for example, over a network 2304.

Where the input document is converted to multiple output format documents, the output documents may be stored in memory of computer system 2302 at least until the appropriate output format document is displayed by the output display device. Alternatively, all the output format documents may be sent to the output display device and the suitable output format may be determined by executing the JAVA™ script as described above. In another alternative, process 2500 may generate only one output document in an output format requested by the user or determined to be the appropriate format displayable by the output display device. Thus, process 2500 may dynamically convert the input format document to the appropriate output format document depending upon the appropriate output display format.

Preferably, process 2500 may also include determining if a browser of the output display device supports certain executables contained in the original input document. For example, as noted above, the intermediate and output format documents preferably retains any embedded animation, sounds and/or music, as well as the execution of links to start up other applications. Thus, process 2500 may determine if any or all of such executables contained in the original input document is supported or executable by the output display device. If certain of such executables is not supported or executable by the output display device, process 2500 may remove such embedded executables to avoid error messages. Alternatively, conversion step 2510 may automatically remove or retain such embedded executables depending upon the format of the output document.

In another embodiment, certain optimization steps may be performed in order to optimize the output for specific browsers or specific characteristics. For example, process 2500 may optimize the output document where the output display device utilizes INTERNET EXPLORER™, NETSCAPE™ or process 2500 may optimize the output document for space, accuracy, and/or output as single or multiple files. These parameters may be set to certain defaults and/or specific by the user. The user may also specify a text only or image only output. Alternatively, conversion step 2510 may perform such optimization steps.

Figure 27:
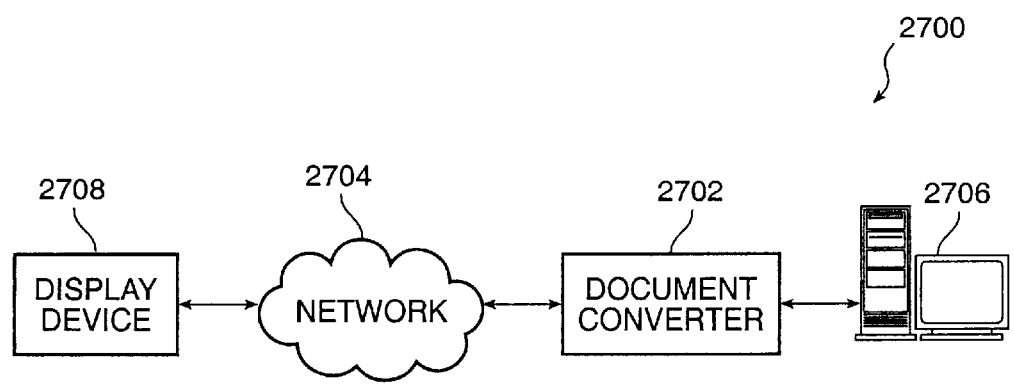
FIG. 27 shows a schematic of a system in which the knowledge base or document repository using a uniform storage format may be used.
Figure 26:
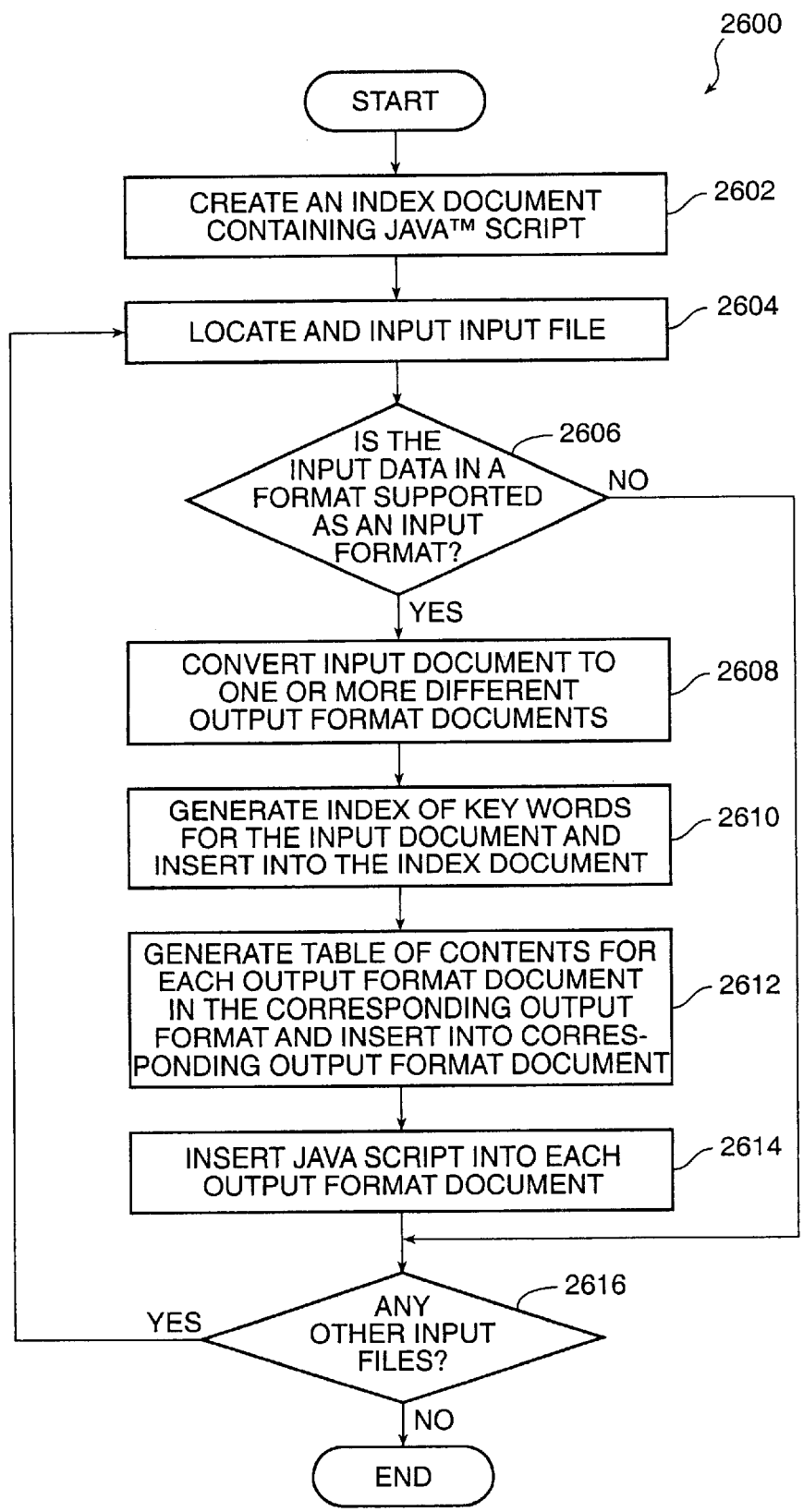
FIG. 26 shows a flow diagram illustrating a process for generating a knowledge base or document repository using a uniform storage format.

FIG. 26 shows a flow diagram illustrating a process 2600 for generating a knowledge base or document repository using one or more storage formats. FIG. 27 shows a schematic of a system 2700 in which the knowledge base or document repository using a uniform storage format may be used.

As shown, the above-described conversion process may be utilized to generating a knowledge base or document repository of documents in various input formats using, for example, a single uniform storage format. The documents stored in the storage format can also be subsequently converted to other output formats for display on a display device. Preferably, where a single uniform storage format is utilized, the output format is HTML Version 4.0. However, other storage formats may be utilized.

Process 2600 first creates an index document which contains JAVA™ script preferably at the beginning of the document. The JAVA™ script, as described above, may be executed by the display device such as the PDA to select a suitable output format from the plurality of output formats generated for display. Other programming languages may be utilized although JAVA™ is preferred. The index document may be utilized by a search engine, for example, to search for document containing certain key words. Each keyword contained in the index document may include links to the keyword contained in one or more input documents.

Process 2600 then locates and inputs an input document or file at step 2604 and determines if the input document is in a supported input format at step 2606. If the input document is in a supported input format, step 2608 converts the input document to one or more different output format documents. Conversion step 2608 is preferably as described above, utilizing an intermediate format. Preferably, an index of all or certain key words of the input document is generated and inserted into the index document at step 2610. In addition, a table of contents is preferably generated at step 2612 for each output format document in the corresponding output format and inserted into the corresponding output format document. A JAVA™ script may be inserted into the output format document at step 2615, preferably at the beginning of the output document. The JAVA™ script, as described above, may be executed by the display device such as the PDA to select a suitable output format from the plurality of output formats generated for display. Other programming languages may be utilized although JAVA™ is preferred.

After step 2614 or if step 2606 determines that the input document is not in a supported input format, step 2616 determines if there are any other input files. If there are other input files, process 2600 continues from step 2604. If there are no other input files, process 2600 is complete.

A repository generated by process 2600 preferably stores the input documents in the input format as well as the one or more storage formats. As additional input documents are received by the repository, process 2600 converts each additional input document to one or more storage formats. Where more than one storage format is utilized, a single converted document may be generated containing the input document in multiple storage formats. Alternatively, multiple storage documents may be generated, each in a different storage format.

The knowledge base or document repository generated by process 2600 may be used in conjunction with input-output format converter including the display reformatting function described above. For example, a request may be made from a PDA to view a document from the repository. The input and repository storage formats may be different from a format suitable for display on the PDA. The input-output format converter may be utilized to convert the storage format repository document to an output format document suitable for display on the PDA.

The system 2700 shown in the schematic of FIG. 27 utilizes the knowledge base or document repository generated using process 2600 described above. System 2700 includes a document converter 2702 coupled to a network 2704 and a computer system 2706 storing the knowledge base or document repository. Document converter 2702 may be similar to that described above wherein a document may be converted to an intermediate format document and then to a document in a different format. Network 2704 may be the Internet or an intranet, for example. Various display devices 2708 may be coupled to network 2704. Examples of display devices include PDAs, laptop computers, desktop PCs, internet connected televisions, cellular or wireless telephones, pagers, and/or voice-only products. Other configurations of system 2700 may be implemented to utilize the knowledge base or document repository generated by process 2600.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

What is claimed is:

1. A computer implemented method of converting a first document in a first document file format to a second document in a second document file format different from the first document file format, comprising:
- locating first document file format data in the first document;
- grouping said first document file format data into at least one intermediate document file format block in an intermediate document file format document, including locating words in the first document, joining words into lines, and joining lines into paragraphs, each paragraph being one of said intermediate format blocks;
- locating tables, each table being one of said intermediate format blocks; and
- converting said intermediate document file format document to the second document in the second document file format using said intermediate document file format blocks.

2. The computer implemented method of claim 1, wherein said grouping comprises:
- locating tags in the first document; and
- utilizing the tags in locating words, joining words into lines, joining lines into paragraph, and locating tables.

3. The computer implemented method of claim 1, wherein each intermediate format block is selected from the group consisting of a word, a line, a paragraph, a table, and an image.

4. The computer implemented method of claim 1, wherein each of the first format and second format is selected the group consisting of portable document format (PDF), rich text format (RTF), hypertext markup language (HTML), extensible markup language (XML), cascading style sheets (CSS), Netscape Layers, linked and separate pages, Tag Image File Format (TIFF), graphics interchange format (GIF), bit map (BMP), Joint Photographic Experts Group (JPEG), MICROSOFT WORD™, WORD PERFECT™, AUTOCAD™, and POWER POINT™.

5. The computer implemented method of claim 1, wherein the second format is selected from hypertext markup language (HTML) and rich text format (RTF), comprising:
- determining coordinates of each intermediate format block;
- generating a second format block for each intermediate format block;
- generating a second format style sheet for each intermediate format block, coordinates of each second format style sheet match coordinates of corresponding intermediate format block;
- mapping an intermediate format block font to second format font to fit second format block into second format style sheet; and
- placing each second format block into corresponding second format style sheet.

6. The computer implemented method of claim 1, wherein the second format is an image bitmap format, comprising:
- generating bitmap of the intermediate format document using intermediate format blocks; and
- placing the bitmap into second image document.

7. The computer implemented method of claim 1, wherein the first document is received over a network and the second document is sent over the network.

8. The computer implemented method of claim 7, wherein the network is selected from the group consisting of Internet and an intranet.

9. The computer implemented method of claim 8, wherein the receiving and the sending is via electronic mail.

10. The computer implemented method of claim 7, further comprising
- locating headings of the first document;
- generating a table of contents page containing the headings in the second format, each table of contents heading containing a link to the heading contained in the document; and
- placing the table of contents page into the second document.

11. The computer implemented method of claim 7, wherein said converting said intermediate format document to the second format document is selected from the group consisting of:
- converting to the second format document in one second format;
- converting to the second format document in multiple second formats; and
- converting to the multiple second format documents, each in a different second format.

12. The computer implemented method of claim 11, further comprising:
- generating a computer executable program for selecting one second format to be displayed; and
- inserting the computer executable program into the second document.

13. The computer implemented method of claim 12, wherein the computer executable program is written in a programming language selected from the group consisting of a JAVA, Common Gateway Interface (CGI), Visual Basic, Practical extraction and reporting language (Perl), C, and C++.

14. A computer implemented method of converting a first document in a first format to a second document in a different, second format in hypertext markup language (HTML), comprising:
- locating data in the first document;
- grouping data into at least one intermediate format block in an intermediate format document;
- converting said intermediate format document to the second HTML document using said intermediate format blocks;
- generating a table of coordinates wherein at least a subset of said coordinates correspond to a coordinate of each intermediate format block; and
- placing each intermediate format block on the corresponding coordinate in the table of coordinates.

15. The computer implemented method of claim 7, wherein said generating the table of coordinates comprises:
- determining gaps extending across the intermediate format document;
- creating a macro table having cells corresponding to portions of the intermediate format document outside of said gaps; and
- recursively dividing each cell of the macro table by determining gaps extending across the cell until each cell cannot be further divided.

16. A computer program product for converting a document in a first document file format to a document in a second document file format different from the first document file format, comprising:

computer code that locates first document file format data in the first document;

computer code that groups said first document file format data into at least one intermediate document file format block in an intermediate document file format document, said computer code that groups includes computer code that locates words in the first document, joins words into lines, and joins lines into paragraphs, each paragraph being one of said intermediate format blocks;

computer code that locates tables, each table being one of said intermediate format blocks;

computer code that converts said intermediate document file format document to the second document in the second document file format using said intermediate document file format blocks; and a computer readable medium that stores the computer codes.

17. The computer program product of claim 16, wherein the computer readable medium is selected from the group consisting of CD-ROM, zip disk, floppy disk, tape, flash memory, system memory, hard drive, and data signal embodied in a carrier wave.

18. A computer implemented method for displaying a document, comprising:

receiving a document for display;

automatically locating sub-page breaks in the received document;

subdividing the received document into sub-pages using the sub-page breaks;

locating blocks within each sub-page; and sequentially displaying at least a portion of each block of the sub-pages within display parameters of a display configuration, including determining if each block can be displayed within display parameters of the display configuration and dividing a block not within display parameters into portions to be within the display parameters of the display configuration, said dividing a block including:

determining if the block is a table;

if the block is not a table, sequentially displaying each element of the block until all element of the block are displayed;

if the block is a table:

determining the headings of the table and subset of non-heading columns of the table displayable within the display parameters;

display the subset of non-heading columns of all rows of the table; and continue determining a next subset of non-heading columns of the table displayable within the display parameters and displaying those columns of all rows of the table until all rows and all columns of the table have been displayed.

19. The computer implemented method for displaying a document of claim 18, wherein the document is in a markup language format.

20. The computer implemented method for displaying a document of claim 18, further comprising:

locating headings of the document;

generating a table of contents page containing the headings, each table of contents heading containing a link to the heading contained in the document; and placing the table of contents page into the second document.

21. A computer program product for maintaining a repository of first documents in at least one storage document file format, comprising:

computer code that receives at least one first document, said at least one first document being in at least one first document file format;

computer code that converts the first documents in the at least one first document file format to storage documents in the at least one storage document file format, said storage document file format containing storage format blocks, said computer that converts includes computer code that locates words in the first documents, joins words into lines, joins lines into paragraphs, each paragraph being one of said storage format blocks, and locates tables, each table being one of said intermediate format blocks; and a computer readable medium that stores the computer codes.

22. The computer program product of claim 21, wherein the computer readable medium is selected from the group consisting of CD-ROM, zip disk, floppy disk, tape, flash memory, system memory, hard drive, and data signal embodied in a carrier wave.

23. The computer program product of claim 21, further comprising computer code that converts the storage documents to a display document.

24. The computer program product of claim 21, further comprising computer code that locates keywords in the first documents; and computer code that generates an index document of the located keywords, the index document containing the keywords, each keyword containing at least one link to the keyword contained in at least one first document.

25. The computer program product of claim 21, further comprising:

computer code that generates a computer executable program for selecting one second format; and computer code that inserts the computer executable program into the second document.

26. The computer program product of claim 21, further comprising:

computer code that locates headings of the first documents;

computer code that generates a table of contents page for each first document, the table of contents page containing the headings, each table of contents heading containing a link to the heading contained in the first document; and computer code that places the table of contents page into the second document.

* * * * *